(12) United States Patent
James

(10) Patent No.: US 9,083,700 B2
(45) Date of Patent: Jul. 14, 2015

(54) SYSTEMS AND METHODS FOR AUTHORIZATION OF INFORMATION ACCESS

(71) Applicant: Vicki L. James, Crown Point, IN (US)

(72) Inventor: Vicki L. James, Crown Point, IN (US)

(73) Assignee: Vicki L. James, Crown Point, IN (US)

( * ) Notice: Subject to any disclaimer, the term of this patent is extended or adjusted under 35 U.S.C. 154(b) by 99 days.

(21) Appl. No.: 14/090,850

(22) Filed: Nov. 26, 2013

(65) Prior Publication Data

US 2014/0082712 A1    Mar. 20, 2014

Related U.S. Application Data

(62) Division of application No. 12/074,037, filed on Feb. 29, 2008, now Pat. No. 8,621,641.

(51) Int. Cl.
*H04L 29/00* (2006.01)
*H04L 29/06* (2006.01)

(52) U.S. Cl.
CPC .............. *H04L 63/083* (2013.01); *H04L 63/08* (2013.01); *H04L 63/102* (2013.01)

(58) Field of Classification Search
CPC ...... H04L 63/083; H04L 63/08; H04L 63/102
See application file for complete search history.

(56) References Cited

U.S. PATENT DOCUMENTS

| | | | |
|---|---|---|---|
| 4,315,101 A | 2/1982 | Atalla | |
| 5,809,145 A | 9/1998 | Slik et al. | |
| 5,995,606 A | 11/1999 | Civanlar et al. | |
| 6,012,144 A | 1/2000 | Pickett | |
| 6,044,471 A | 3/2000 | Colvin | |
| 6,073,106 A * | 6/2000 | Rozen et al. | 705/3 |
| 6,088,683 A | 7/2000 | Jalili | |
| 6,167,518 A | 12/2000 | Padgett et al. | |
| 6,175,626 B1 | 1/2001 | Aucsmith et al. | |
| 6,212,634 B1 | 4/2001 | Geer, Jr. et al. | |
| 6,279,112 B1 | 8/2001 | O'Toole, Jr. et al. | |
| 6,314,409 B2 | 11/2001 | Schneck et al. | |
| 6,385,729 B1 | 5/2002 | Digiorgio et al. | |
| 6,389,541 B1 | 5/2002 | Patterson | |
| 6,442,696 B1 | 8/2002 | Wray et al. | |
| 6,523,116 B1 | 2/2003 | Berman | |
| 6,574,599 B1 | 6/2003 | Lim et al. | |
| 6,581,059 B1 | 6/2003 | Barrett et al. | |
| 6,640,304 B2 | 10/2003 | Ginter et al. | |
| 6,718,328 B1 | 4/2004 | Norris | |
| 6,757,720 B1 | 6/2004 | Weschler, Jr. | |
| 6,771,290 B1 | 8/2004 | Hoyle | |
| 6,826,690 B1 | 11/2004 | Hind et al. | |

(Continued)

*Primary Examiner* — Michael Pyzocha
(74) *Attorney, Agent, or Firm* — Ryan Kromholz & Manion, S.C.

(57) ABSTRACT

Systems and methods according to the present invention provide a proactive approach to controlling access to information that may be correlated with a governmentally issued personal identifier. Included are systems and methods for proactive control of information access and liability incursion. Further included are systems and methods for emulating information access to an authorized person. Generally, a method according to the present invention includes the steps of requesting verification from a subscriber at any time that information is requested from registered information holders and any time that liability may be incurred through registered information holders. In this way, the subscriber, rather than reacting to invasive information or identity theft, may proactively control access to such information, thereby preventing the theft in the first place.

9 Claims, 18 Drawing Sheets

(56) References Cited

U.S. PATENT DOCUMENTS

| | | | |
|---|---|---|---|
| 6,834,271 B1 | 12/2004 | Hodgson et al. | |
| 6,856,982 B1 | 2/2005 | Stevens et al. | |
| 6,857,067 B2 | 2/2005 | Edelman | |
| 6,898,421 B2 | 5/2005 | Mori et al. | |
| 6,934,858 B2 | 8/2005 | Woodhill | |
| 6,978,369 B2 | 12/2005 | Wheeler et al. | |
| 6,978,380 B1 | 12/2005 | Husain et al. | |
| 6,980,970 B2 | 12/2005 | Krueger et al. | |
| 7,017,041 B2 | 3/2006 | Sandhu et al. | |
| 7,028,013 B2 | 4/2006 | Saeki | |
| 7,039,809 B1 | 5/2006 | Wankmueller | |
| 7,100,200 B2 | 8/2006 | Pope et al. | |
| 7,111,172 B1 | 9/2006 | Duane et al. | |
| 7,127,233 B2 | 10/2006 | Miller et al. | |
| 7,149,895 B1 | 12/2006 | Asokan et al. | |
| 7,155,739 B2 | 12/2006 | Bari et al. | |
| 7,174,320 B2 | 2/2007 | Rothrock | |
| 7,177,848 B2 | 2/2007 | Hogan et al. | |
| 7,177,849 B2 | 2/2007 | Fieschi et al. | |
| 7,194,759 B1 | 3/2007 | Chess et al. | |
| 7,200,575 B2 | 4/2007 | Hans et al. | |
| 7,222,101 B2 | 5/2007 | Bishop et al. | |
| 7,231,373 B2 | 6/2007 | Kidd et al. | |
| RE39,736 E | 7/2007 | Morrill, Jr. | |
| 7,254,560 B2 | 8/2007 | Singhal | |
| 7,269,852 B2 | 9/2007 | Uemura et al. | |
| 7,272,849 B2 | 9/2007 | Brown | |
| 7,274,525 B2 | 9/2007 | Takano | |
| 7,275,110 B2 | 9/2007 | Umbreit | |
| 7,275,262 B1 | 9/2007 | Habert | |
| 7,281,273 B2 | 10/2007 | Strom et al. | |
| 7,287,158 B2 | 10/2007 | Futamura et al. | |
| 7,305,702 B2 | 12/2007 | Bell et al. | |
| 7,308,431 B2 | 12/2007 | Asokan et al. | |
| 7,325,136 B2 | 1/2008 | Alldredge | |
| 7,343,351 B1 | 3/2008 | Bishop et al. | |
| 7,418,256 B2 | 8/2008 | Kall et al. | |
| 7,552,467 B2 | 6/2009 | Lindsay | |
| 2001/0039535 A1 | 11/2001 | Tsiounis et al. | |
| 2001/0053685 A1 | 12/2001 | Mori et al. | |
| 2002/0029336 A1 | 3/2002 | Sekiyama et al. | |
| 2002/0046061 A1* | 4/2002 | Wright et al. | 705/3 |
| 2002/0049907 A1 | 4/2002 | Woods et al. | |
| 2002/0077837 A1 | 6/2002 | Krueger et al. | |
| 2002/0111816 A1* | 8/2002 | Lortscher et al. | 705/1 |
| 2002/0123972 A1 | 9/2002 | Hodgson et al. | |
| 2002/0143634 A1 | 10/2002 | Kumar et al. | |
| 2003/0074456 A1 | 4/2003 | Yeung et al. | |
| 2003/0195859 A1 | 10/2003 | Lawrence | |
| 2003/0214678 A1 | 11/2003 | Shibata et al. | |
| 2003/0221125 A1 | 11/2003 | Rolfe | |
| 2004/0083170 A1 | 4/2004 | Bam et al. | |
| 2004/0098366 A1 | 5/2004 | Sinclair et al. | |
| 2004/0153655 A1 | 8/2004 | Rolfe | |
| 2005/0177750 A1* | 8/2005 | Gasparini et al. | 713/201 |
| 2006/0021011 A1* | 1/2006 | Kaplan | 726/5 |
| 2006/0136334 A1 | 6/2006 | Atkinson et al. | |
| 2006/0143119 A1 | 6/2006 | Krueger et al. | |
| 2006/0155842 A1 | 7/2006 | Yeung et al. | |
| 2006/0195361 A1* | 8/2006 | Rosenberg | 705/14 |
| 2006/0225136 A1 | 10/2006 | Rounthwaite et al. | |
| 2006/0282901 A1 | 12/2006 | Li et al. | |
| 2007/0027807 A1 | 2/2007 | Bronstein | |
| 2007/0048765 A1 | 3/2007 | Abramson | |
| 2007/0055892 A1 | 3/2007 | Pikus | |
| 2007/0078683 A1 | 4/2007 | Grajales et al. | |
| 2007/0130101 A1 | 6/2007 | Anderson et al. | |
| 2007/0136823 A1 | 6/2007 | Miyazaki et al. | |
| 2007/0138253 A1 | 6/2007 | Libin et al. | |
| 2007/0170247 A1* | 7/2007 | Friedman | 235/380 |
| 2007/0179895 A1 | 8/2007 | Bishop et al. | |
| 2007/0239621 A1 | 10/2007 | Stukanov | |
| 2007/0245157 A1 | 10/2007 | Giobbi et al. | |
| 2007/0271602 A1 | 11/2007 | Harrison | |
| 2008/0103800 A1* | 5/2008 | Domenikos et al. | 705/1 |
| 2008/0110980 A1 | 5/2008 | Hogg et al. | |
| 2008/0263175 A1* | 10/2008 | Naono et al. | 709/217 |
| 2008/0270520 A1 | 10/2008 | Reid et al. | |
| 2009/0006858 A1 | 1/2009 | Duane et al. | |
| 2009/0083076 A1* | 3/2009 | Hashim | 705/4 |

\* cited by examiner

SYSTEMS AND METHODS FOR AUTHORIZATION OF INFORMATION ACCESS

RELATED APPLICATIONS

This application is a divisional of co-pending U.S. patent application Ser. No. 12/074,037, filed 29 Feb. 2008, and entitled "Systems and Methods for Authorization of Information Access."

BACKGROUND OF THE INVENTION

The present invention relates generally to controlled information access, and more specifically to systems and methods for the authorization of access to information that may be correlated directly to a personal identifier that is created and assigned by a governmental organization or that may be correlated directly through one or more secondary personal or account identifiers to a personal identifier that is created and assigned by a governmental organization.

The use of computers, the Internet, and wireless technology has simplified the process of communicating and transacting in today's society. This technology enables and simplifies credit approvals, e-commerce, funds transfer to and from financial accounts, and access to information on specific topics or personal data such as credit card or bank account balances. Few would dispute the convenience that such technology has brought to the lives of those who use it. However, following close behind the horse of convenience is a chariot of vulnerability; specifically, a vulnerability to financial identity theft.

Identity theft and associated fraud has become a major concern for consumers. The United States Federal Trade Commission has reported that an estimated nine million Americans have their identity stolen every year. One survey has indicated that in 2006 alone, total fraud attributable to identity theft was 49.3 billion dollars. It has also been reported that a time in excess of forty man hours is expended on resolution of each instance of identity theft. Therefore, over one-hundred and fifty thousand man years are consumed in resolving such matters. Moreover, because stolen personal information may routinely be sold and traded among criminals, a data theft victim may have to resolve issues months and even years after the initial theft.

Perhaps the greatest keys that identity thieves possess are government issued identifiers and perhaps some associated or correlated information. Government issued identifiers, that is, identifiers created and assigned by a governmental body, such as social security numbers, for example, and information correlated to them are particularly vulnerable to theft and misuse because they may be easily accessed by a multitude of people other than the person to whom the number was issued. A social security number and information correlated to it are commonly used by colleges, banks, investment firms, hospitals, employers, insurance companies and many other organizations to manage and access an individual's personal records. More importantly, this information is the key required to open many financial doors such as securing credit or opening bank accounts. This makes this data exceptionally attractive to data thieves.

Because government issued identifiers and correlated data are typically electronically stored by organizations utilizing this information, the same is particularly susceptible to theft if not properly secured. It is common to read about the theft of laptops or hacking of computer files that contain names, addresses, birthdates, and social security numbers of individuals. In a period of less than three years, companies and government agencies reported security breaches of more than 200 million records containing the personal data of individuals. The theft of personal information has become such an issue that the majority of states have enacted legislation requiring that consumers affected by a data security breach be notified within a specified period of time. This notification must also include measures that the consumer may take to protect his financial identity. These measures may include activating a fraud alert which requires additional identification verification before the issuance of credit or a security freeze with the credit reporting agencies to restrict the release of credit data, and ongoing monitoring of credit bureau reports to detect fraudulent activity.

Prior information protection measures consisted primarily of reactive measures and rudimentary, often ineffective proactive measures. While consumers are fully aware of the value of their personal information and realize at least some vulnerability for information forgery or theft, consumers have had to rely upon security procedures and protocols of companies that hold or have general access to the consumers' personal information. Often times, once such protocols have been breached, the only recourse left to a victimized consumer is to completely shut down accounts or disassociate himself or herself from service providers. Upon such shut down or disassociation, transaction costs are further exacerbated by the fact that the consumer is then left to find other service providers, which may provide the exact same services as those he or she was previously associated.

Regarding prior rudimentary and generally ineffective proactive measures, examples include regular, or rather often irregular, manual password modifications for online account access and also certain "flag" settings on credit accounts. Other steps include shredding personal documents before discarding them, protecting one's government issued identifier or related information by not carrying them on one's person and by being mindful of giving personal information over the phone or online, and monitoring one's credit report. While these measures are valuable tips for deterring and/or detecting personal data theft, such measures do not protect personal data that may be stored at external organizations. Rather, consumers are completely dependent on these organizations to protect their personal information.

Another proactive measure utilized prior to the present invention was a security freeze placed on a consumer's credit information by various credit bureaus. This freeze is typically placed on the credit information of identity theft victims. Such freeze may delay, interfere with, or prevent the timely approval of any legitimate requests for new loans, consumer credit, mortgages, employment, housing or other services. Additionally, a typical fraud alert may be utilized, which often suspends pre-approved credit offers to a consumer for a specified period of time. However, a given consumer may wish to protect valuable financial information while still receiving such special offers.

Likewise, online banking, online bill pay, and online access of credit or financial portfolio statements each comes with its own set of security risks, particularly if a public computer, such as those found in hotels, is used to access personal financial information. Data thieves have been known to place data capture devices on these public computers to capture the user name and passwords of unsuspecting consumers. These user names and passwords are then used to conduct fraudulent financial activity.

Although state and federal laws generally limit victim responsibility for fraudulent purchases, such laws are inefficient because the overall impact of identity theft is much broader than financial liability. Restoring one's credit standing can be a long, arduous process. The art of information access control would benefit from systems and methods that allow greater proactive, or front-end, information access and/or liability control.

SUMMARY OF THE INVENTION

Systems and methods according to the present invention provide greater proactive, or front-end, information access and/or liability control. A first method according to the present invention may be a method of managing online account profile information. Such method may be undertaken by a verification system, the first method including the step of registering a first client identifier, which may be a variable static client identifier, such as a personal identification number (PIN). The verification system preferably synchronizes to a second client identifier, which may be a dynamic client identifier. The verification system receives the first client identifier and the second client identifier and then creates an emulation session communication link. The second client identifier may be received before or after the first client identifier. The verification system provides a selection of servers, where the servers are connected to an information network. The verification system receives a user selection of one of the servers and then logs into the selected server using a site, or account, username and an initial site, or account, password, thereby enabling access to information correlated with an identifier that has been governmentally issued, wherein the information is accessible by the selected server. The verification system also communicates with the selected server to change the site password, thereby creating a modified site password and overwrites the initial site password, which is preferably stored by the verification system, with the modified site password. The emulation session communication link is then terminated.

The initial site username is preferably different than the first client identifier and also different than the second client identifier. The initial site password is also preferably different than the first client identifier and also different than the second client identifier. The modified site password is preferably different than the first client identifier and also different than the second client identifier.

Another embodiment of the first method may include the step of receiving a login request prior to the creation of the emulation session communication link. The login request may include a protection service account user name and a protection service account password.

Still another embodiment of the first method may include the step of displaying at least a portion of the information correlated with the governmentally issued identifier over the emulation session communication link. Yet another embodiment of the first method may include a selection of servers that is abstracted from the network internet protocol address of the servers. Yet another embodiment of the first method may include the step of receiving a login request prior to creating the subscriber emulation session. The login request may include a protection service account user name and a protection service account password.

A second method according to the present invention may be a method of registering a client with a verification system. The second method includes the step of receiving a sign-up request and initial profile information from a client. The initial profile information may include a protection service account user name and a protection service account password. The initial profile information may also include a variable static client identifier, such as a PIN, and a security question response, which may be static. The client may be provided with a service list that includes at least one information protection service. The second method further includes receiving a selection from the client, indicating an information protection service provided in the service list. The second method further involves validating the initial profile information, such as validating the format of the information provided by the client. A protection service account is created, and a web server receives a login request comprising at least some of the initial profile information. The login request is validated and then a governmentally issued identifier is received, where the governmentally issued identifier corresponds to the client. The governmentally issued identifier is then correlated with the protection service account.

In another embodiment, the second method may further include the steps of correlating a unique identifier corresponding to a dynamic client identifier device to the protection service account and transmitting the dynamic client identifier device to said client, such as by sending a physical dynamic client identifier device to a post address or responding to a download request. The method may further include the steps of receiving a solicited unique identifier corresponding to the dynamic client identifier device, receiving a dynamic client identifier, and validating the solicited unique identifier and the dynamic client identifier against expected values.

In still another embodiment, the second method may further include the steps of receiving a uniform resource locator and receiving an account user name and an account password to be used to log into an information account accessible through the uniform resource locator. In yet another embodiment, the second method may further include the steps of receiving payment information from said client and validating the payment information.

In a further embodiment, the initial profile information may include a protection service account user name and a protection service account password. In an additional embodiment, the initial profile information may include a variable static client identifier and a static security question response.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

In the preferred embodiment, a client registers for information protection services to be provided by a verification system. A client, as used herein, is a legal person who has an associated governmentally issued identifier (GID), such as a social security number or national insurance number. The term "client" generally also includes those otherwise legally allowed to act on behalf of the legal person who has the associated GID, such as an agent or person with a power of attorney. A governmental entity creates and assigns the GID to the client. An example of a GID is a social security number that is created and assigned to a legal person by the Social Security Administration of the United States government. Another example of a GID is a National Insurance Number created and assigned by the Department for Work and Pensions in the United Kingdom. Yet another example of a GID is a driver's license number issued by the State of Wisconsin Department of Transportation.

A client may have concerns of controlling access to personal information that is correlated to the client's GID. An example of a concern is that a third party may use the client's GID, stealing the client's identity, creating credit accounts on their behalf and then creating liabilities for the client. The client may wish to control proactively the access to such correlated information. The client may further wish to be notified any time any party attempts to establish credit or review the client's credit score or create a liability by using the client's credit or debit card information. Not only may the client wish to be notified, but the client may desire the control to allow or reject the dissemination of information in response to such request for credit or review of credit score.

Figure 1A:
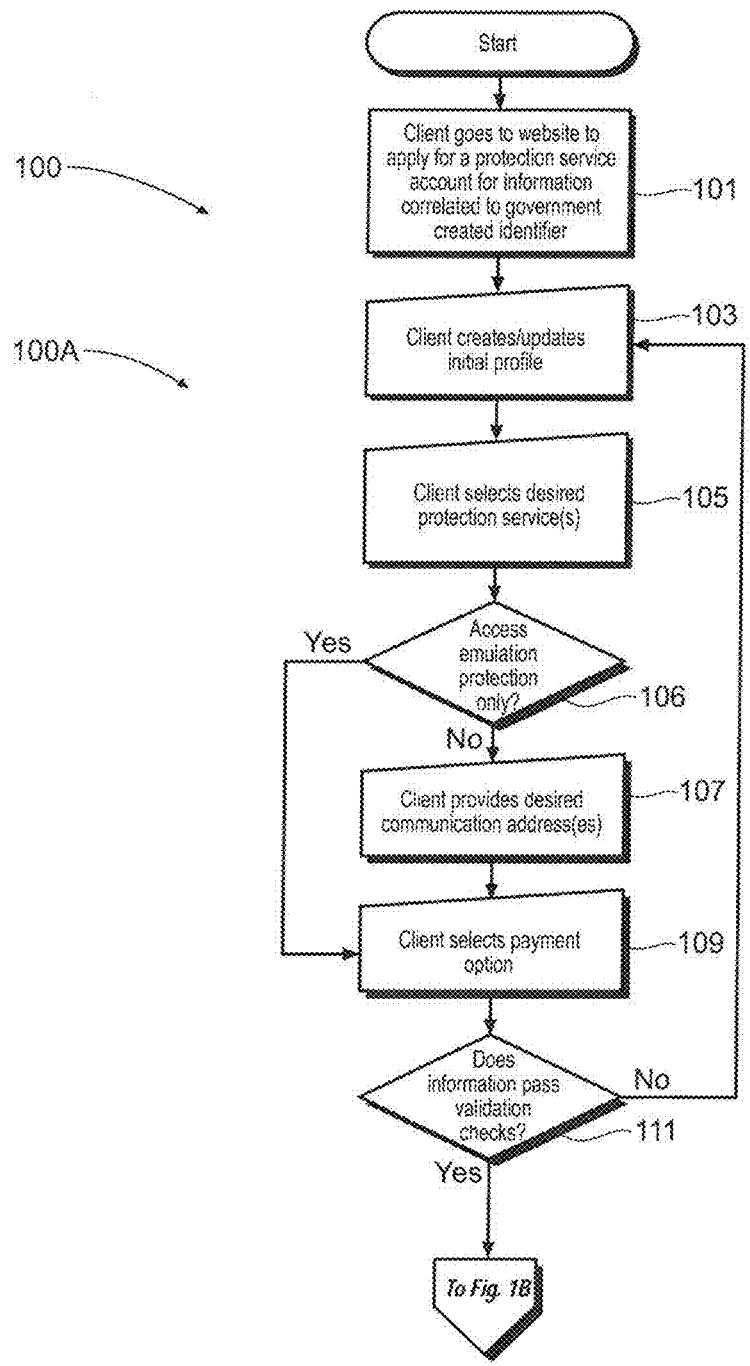
FIGS. 1A and 1B comprise a flow chart of an online sign-up process of a first client registration process according to the present invention.
Figure 1B:
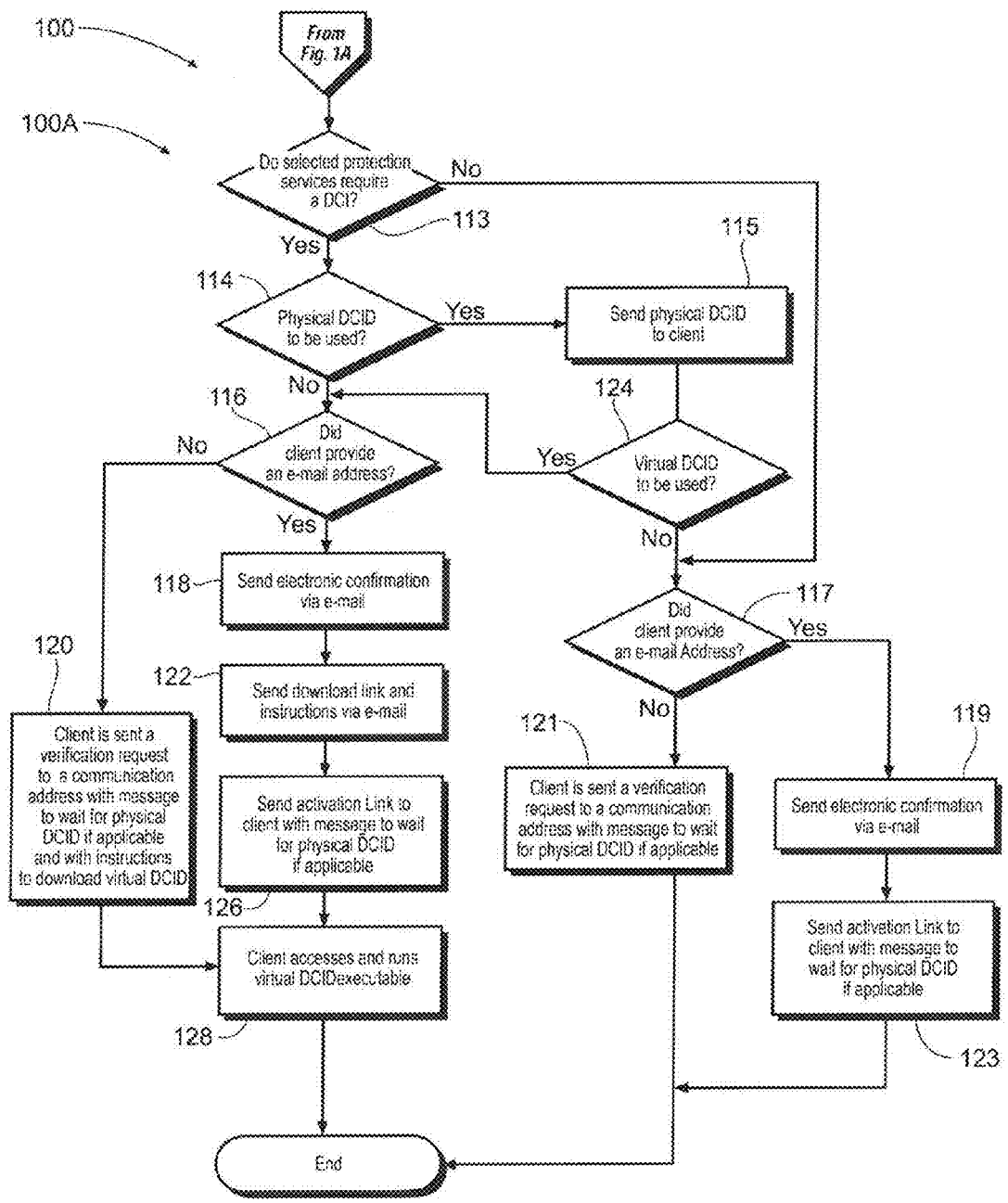
Figure 2:
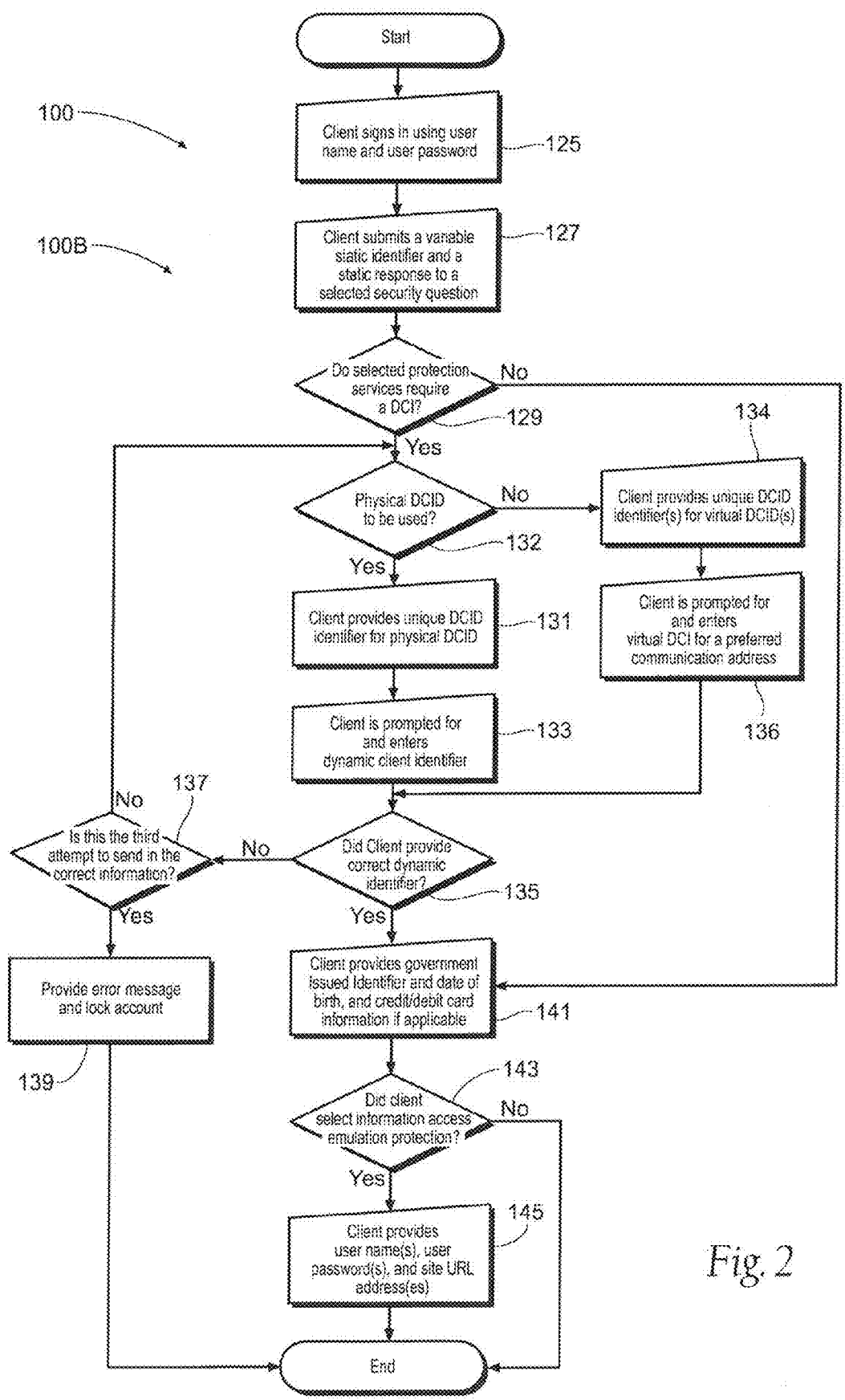
FIG. 2 is a flow chart of an online activation process of the first client registration process according to the present invention.

Upon realization by a client of a desire to control access to information that may be correlated to one or more of his or her GIDs, the client begins the registration process. Turning now to the Figures, FIG. 1A, FIG. 1B and FIG. 2 provide flow charts of an embodiment of an online registration process 100 that may be useful to clients that have regular access to the Internet. FIG. 1A and FIG. 1B provide a flow chart of an online account sign-up process 100A of the online registration process 100. In a first step 101, the client may access and utilize an Internet-capable device (ICD) to proceed to a website to apply for a protection service account (PSA). The ICD may be, for example, a personal computer, a mobile phone, a personal digital assistant (PDA), a global positioning system (GPS) enabled device, and other such devices that have access to the Internet and have a capability to communicate with and navigate web pages. A PSA is a contractual membership account established with a protection service provider. The protection service provider is a legal person that controls a verification system to be used in the control of access to or limiting the use of information correlated to the client's GID.

At a first sign-up data input step 103, the client creates an initial profile through the use of a website accessed through the ICD. The initial profile includes a basic set of information that may include a PSA user name, a PSA user password, and a valid e-mail address. Further, the client may be asked if he or she is an agent for the legal person to whom the GID is associated. If the client indicates that he or she is an agent, proof of the agency relationship must be provided to the protection service provider. Such proof may be mailed by post to the protection service provider or provided in some other format. During the first sign-up data input step 103, the client also preferably provides a designated post address, at which paper communications may be received by the client, and a telephone number where the client may be reached. Upon a coarse verification to determine that data has been entered in a proper format, the client is presented with a second data input form at a second sign-up data input step 105.

Figure 9:
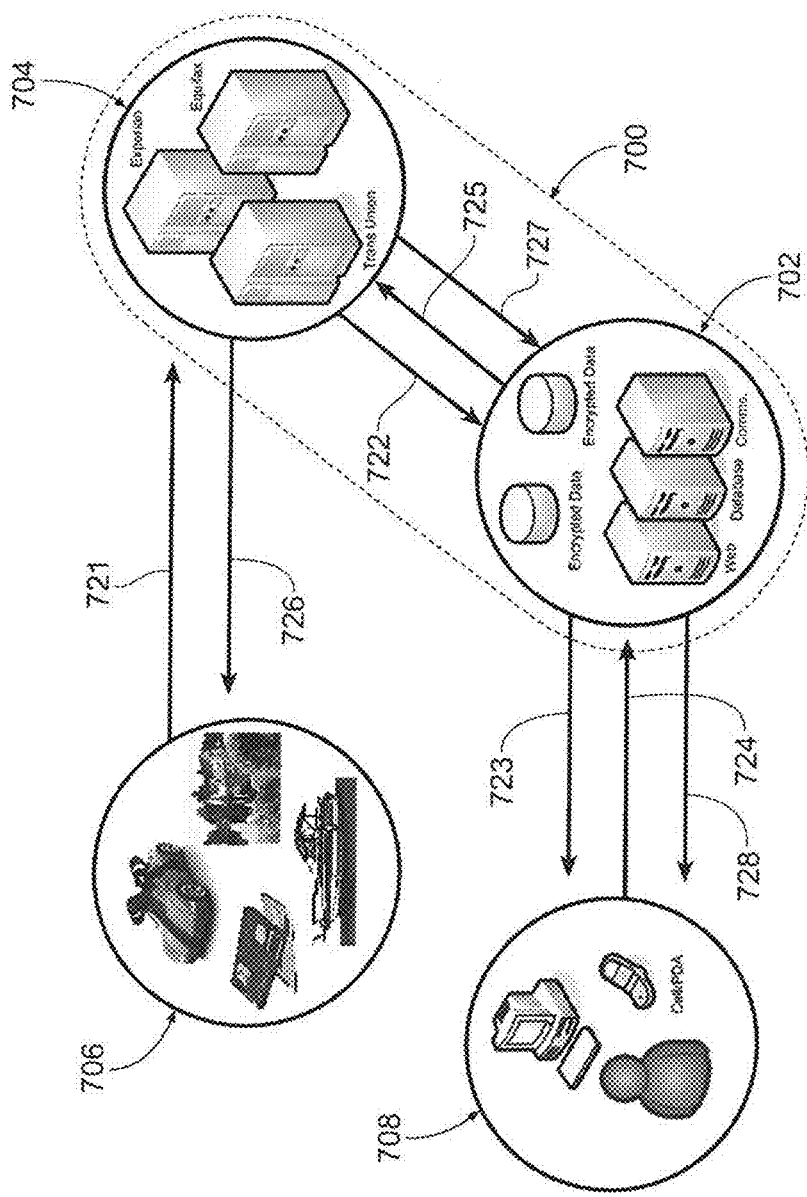
FIG. 9 is a diagrammatic representation of a first information access protection system configuration.

In the second sign-up data input step 105, the client is presented with preferably a plurality of, preferably three, information protection services to select from, their associated prices and legal terms. A first protection service may be referred to as information access protection. A second protection service may be referred to as liability protection. A third protection service may be referred to as data access emulation protection. With reference to FIG. 9, an embodiment 700 of an information access protection system is shown which may implement an information access protection service. This may be referred to as a proactive credit protection system. A component of the information access protection system 700 is a verification system 702. The verification system 702 generally includes at least one web server having access to correlative information that links a subscriber to desired protection services, the correlative information perhaps residing in a secured database. A subscriber is a client that has completed a registration process 100, 200 or combination thereof. The verification system 702 generally receives access system verification requests 722 from information holders 704. Generally, all verification requests discussed herein may be solicited, but are preferably unsolicited. As used herein, an unsolicited request is a request transmitted by a request transmitter to a recipient, where the recipient did not directly communicate with the transmitter to initiate the specific request. Information holders 704 are generally entities that control access to information correlated with persons' GIDs. Additionally, information holders 704 may be the entities that create such correlation between the personal information and the GIDs. An example of such information holders 704 may be credit bureaus. The access system verification request 722 received from the information holder 704 is usually in response to an information request 721, where the request 721 originates from a third party 706 outside of the information access protection system 700, which may or may not be the subscriber 708. Upon receiving an access system verification request 722 from an information holder 704, the verification system 702 transmits a subscriber verification request 723 to a communication address, which is further described below, provided by a subscriber 708 during a registration process. The subscriber verification request 723 may include information about the type of system request 722 received by the verification system 702 or information request 721 received by the information holder 704, the identity of the information holder 704, and/or the identity of the requesting party 706. The verification system 702 may receive a subscriber verification response 724 from the subscriber 708 indicating whether the access system verification request 722 should be granted or denied. The verification system 702 transmits an access system verification response 725 to the information holder 704 that transmitted the access system verification request 722. The access system verification response 725 indicates to the information holder 704 whether or not information correlated to a GID should be disclosed to the third party 706 making the information request 721. The information holder 704 may reply to the information request 721 with an information response 726. The content of the information response 726 may depend upon a given information holder's security protocol. Generally, the information response 726 will include an indication as to whether the request 721 has been granted or denied. Further, if the request 721 has been granted, the information response 726 may include the information requested by the third party 706. In this way, access to information correlated to the subscriber's GID is governed on a timely basis by the subscriber 708. In addition to the responses 725,726 sent by the verification system 702 and the information holder 704, respectively, each may transmit an acknowledgement message to the appropriate party. For instance, once the information response 726 has been transmitted to the third party 706, or has been queued to be sent, the information holder 704 may transmit an information acknowledgment 727 to the verification system 702 indicating, for example, the status of the information response 726 and perhaps any information contained therein, if any. Also, the verification system 702 may transmit a verification acknowledgement 728 to the subscriber 708. The verification acknowledgment 728 may be sent before or after the verification system 702 receives the information acknowledgment 727 from the information holder 704. The verification acknowledgment 728 may inform the subscriber 708 of at least some of the contents of the access system verification response 725, the information response 726, and/or the information acknowledgment 727. Alternatively, the verification acknowledgement 728 may summarize the entire transaction, from the information request 721 through the information acknowledgement 727 for review by the subscriber 708.

While communications between the third party 706 and the information protection system 700 have been described as being directed through the verification system 702, the present invention shall be understood to encompass, in all embodiments, communications external the system 700 alternately directed through an information holder 704 or some other communications intermediary, with access to the verification system 702.

Figure 10:
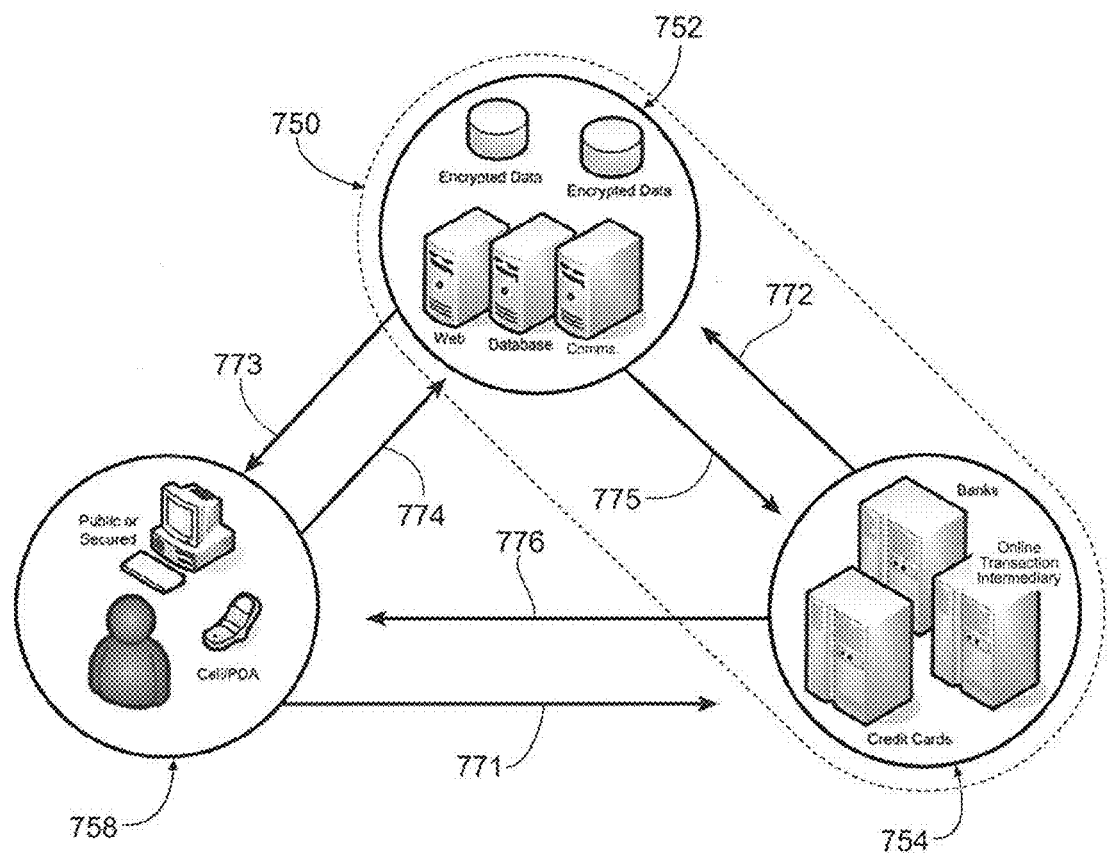
FIG. 10 is a diagrammatic representation of an authorized access to a second information access protection system configuration.

With reference now to FIG. 10, a second embodiment 750 of an information access protection system is provided, which may also implement the information access protection service. This system may be referred to as a proactive on-line account access protection system. In this embodiment 750, a verification system 752 plays a coordinating role, as the verification system 702 performed in the first embodiment 700. Also like the first embodiment 700, this embodiment 750 includes information holders 754. Generally, however, information requests 771 received by the information holders 754 of this embodiment 750 differ slightly from the information requests 721 in the first embodiment 700. The information requests 771 received by the information holders 754 of this embodiment are requests that are usually initiated by a subscriber 758 to the information protection services, himself or herself. In the first embodiment, although the information requests 721 could be received directly from the subscriber 708, it is not uncommon for such information requests 721 to be initiated by persons other than the subscriber 708. Thus, the information holders 754 of the second embodiment 750 may be different types of entities than those 704 of the first embodiment 700. For instance, while the first embodiment 700 may include information holders 704 such as credit bureaus or even medical records holders, the information holders 754 of the second embodiment 750 are preferably those which may be accessed by the subscriber 756 on a regular basis for informational purposes, such as Internet websites allowing access to bank account information, credit card information, or online bill payment information. FIG. 10 depicts an authorized attempted access to personal information controlled by information holders 754. The verification system 752 generally receives access system verification requests 772 from information holders 754. The access system verification request 772 received from the information holder 754 is usually in response to an information request 771, where the request 771 originates from outside of the information access protection system 750. Such request 771 may be made by an online sign-in procedure offered at a website provided by the information holder 754. Upon receiving an access system verification request 772 from an information holder 754, if the account is flagged for verification purposes, the verification system 752 transmits a subscriber verification request 773 to a communication address provided by a subscriber 758 during a registration process. The verification system 752 may receive a subscriber verification response 774 from the subscriber 758 indicating whether the access system verification request 772 should be granted or denied. The verification system 752 transmits an access system verification response 775 to the information holder 754 that transmitted the access system verification request 772. The access system verification response 775 indicates to the information holder 754 whether or not access to account information should be allowed. The information holder 754 may reply to the information request 771 with an information response 776. The content of the information response 776 may depend upon a given information holder's security protocol. Generally, the information response 776 may include an indication as to whether the information request 771 has been granted or denied. In addition to the responses 775,776 sent by the verification system 752 and the information holder 754, respectively, each may transmit an acknowledgement message (not shown) to the appropriate party, as described above with respect to FIG. 9. Further, if the request 771 has been granted, the subscriber 758 is preferably provided with access to the account information held by the information holder 754. In this way, access to accounts containing information correlated to the subscriber's GID is governed on a timely basis by the subscriber 758. That is, although a direct liability may not occur as a result of the access to the personal information, liabilities may arise indirectly through use of the personal information, such as by way of establishment of a line of credit, or attempted withdrawal or transfer of funds.

Figure 11:
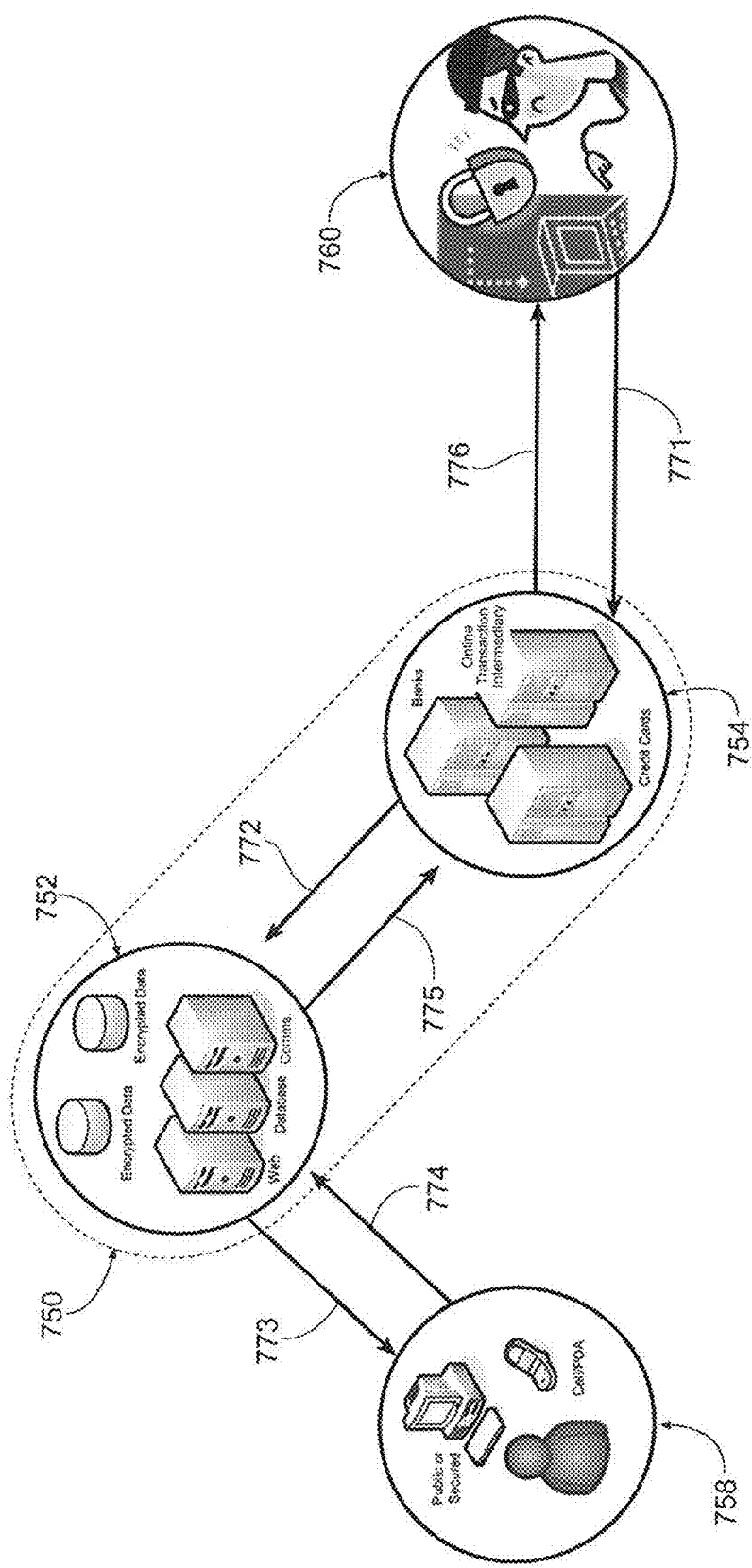
FIG. 11 is a diagrammatic representation of an unauthorized access to the second information access protection system configuration shown in FIG. 10.

FIG. 11 depicts an attempted unauthorized access to one of a client's on-line accounts. The verification system 752 generally receives an access system verification request 772 from an information holder 754. The access system verification request 772 received from the information holder 754 is in response to an information request 771, where the request 771 originates from outside of the information access protection system 750, perhaps from an unauthorized party 760. Such request 771 may be made by an online sign-in procedure offered at a website provided by the information holder 754. Upon receiving an access system verification request 772 from an information holder 754 and if the account is flagged for verification purposes, the verification system 752 transmits a subscriber verification request 773 to a communication address provided by a subscriber 758 during a registration process. The verification system 752 may receive a subscriber verification response 774 from the subscriber 758 indicating that, in the event of an unauthorized attempt, the access system verification request 772 should be denied. The verification system 752 transmits an access system verification response 775 to the information holder 754 that transmitted the access system verification request 772. The access system verification response 775 indicates to the information holder 754 that access has been denied by the subscriber 758. The information holder 754 may reply to the information request 771 with an information response 776, indicating to the unauthorized party 760 that access to the account is not possible at this time. The content of the information response 776 may depend upon a given information holder's security protocol. In addition to the responses 775,776 sent by the verification system 752 and the information holder 754, respectively, each may transmit an acknowledgement message (not shown) to the appropriate party, as described above with respect to FIG. 9.

Figure 12A:
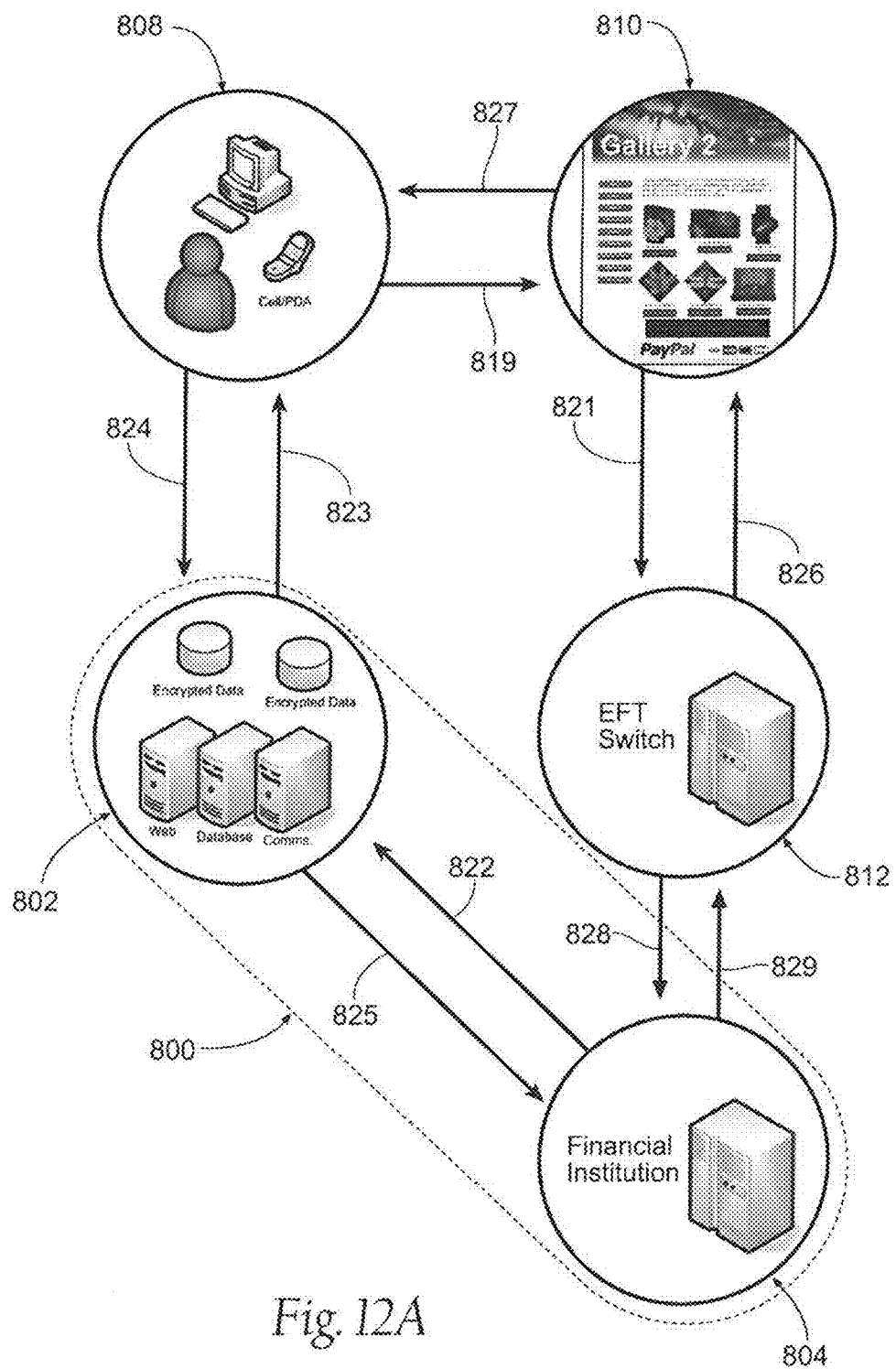
FIG. 12A is a first diagrammatic representation of an authorized access to a liability protection system configuration.
Figure 12B:
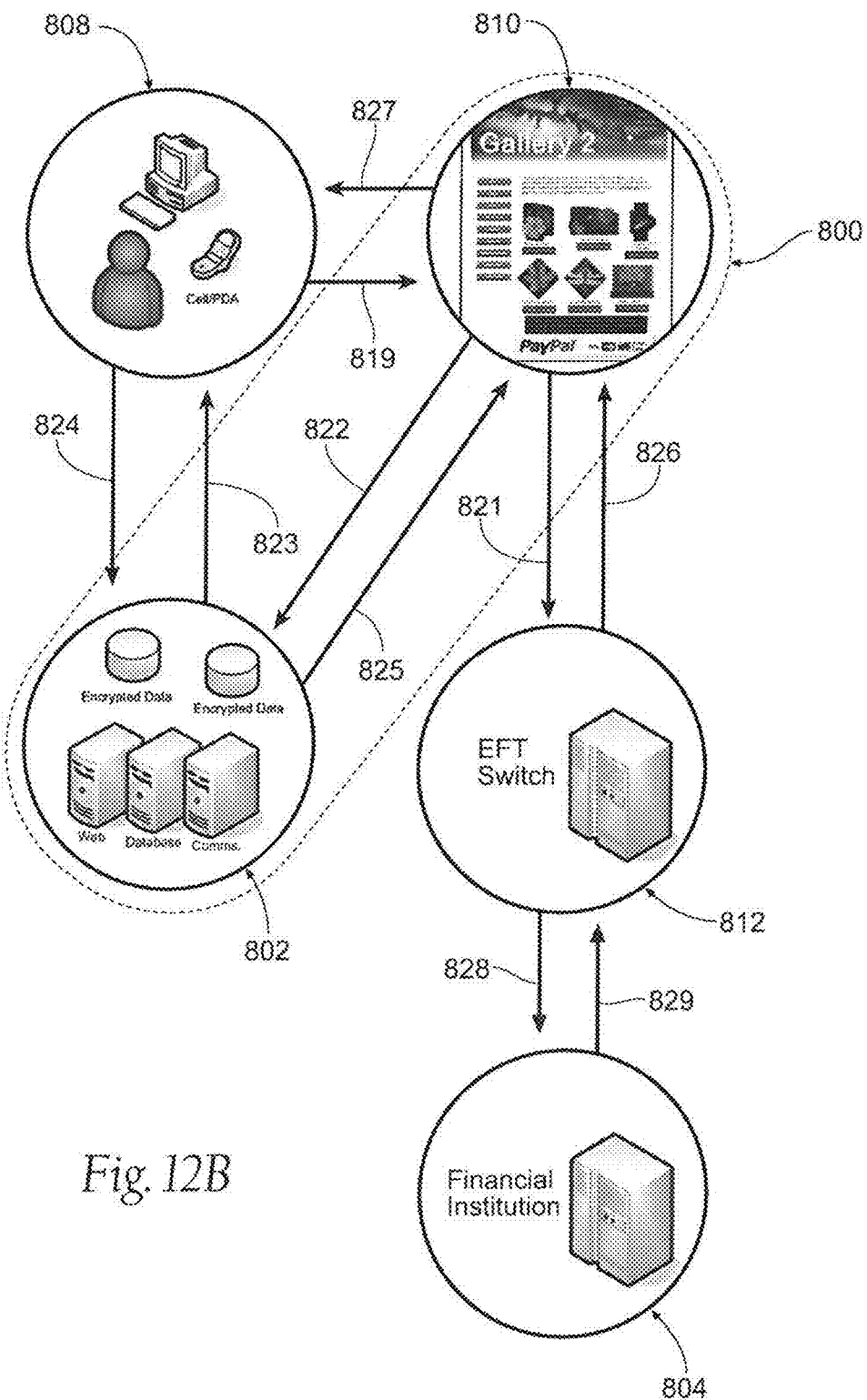
FIG. 12B is a second diagrammatic representation of an authorized access to a liability protection system configuration.
Figure 12C:
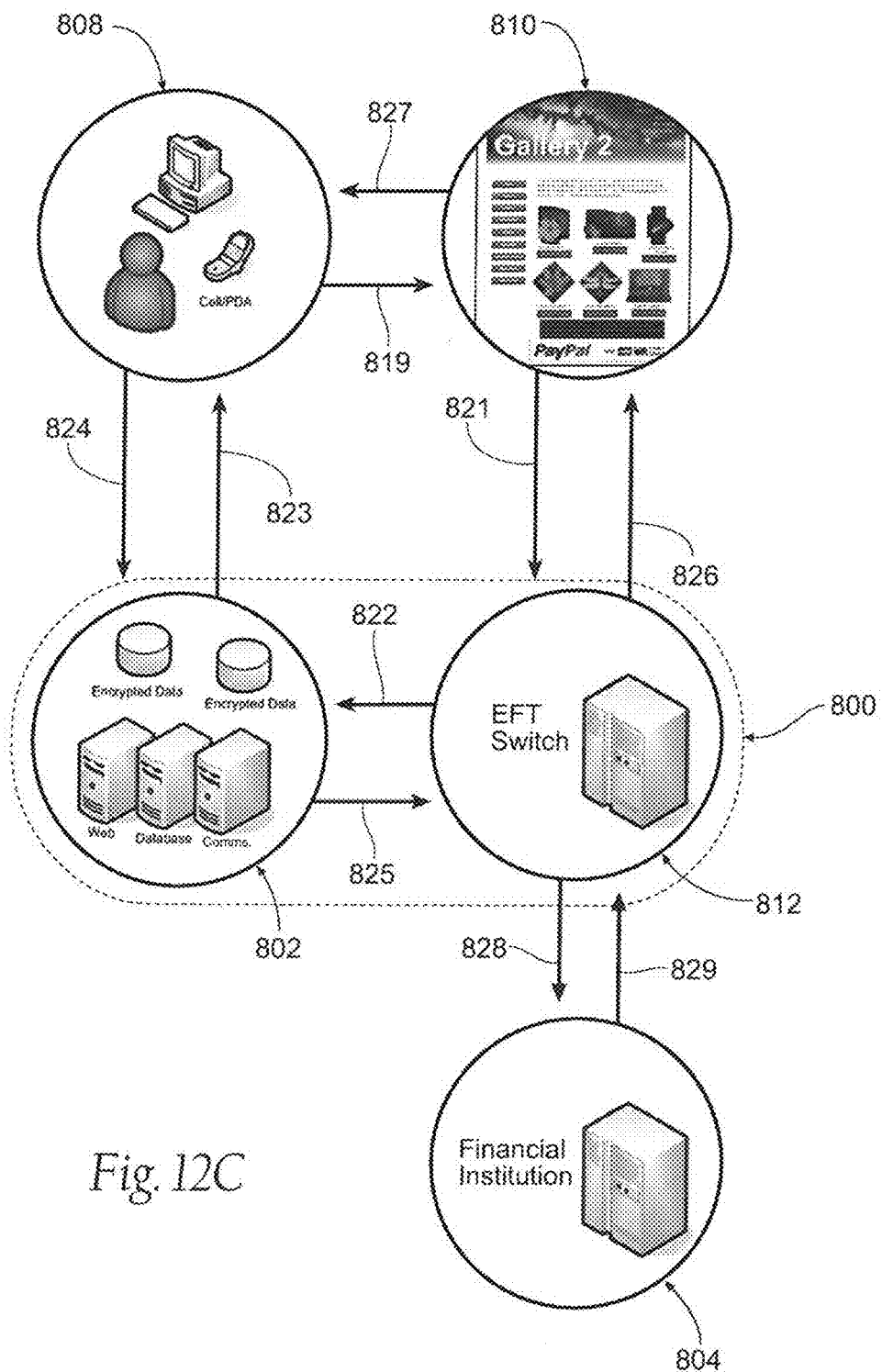
FIG. 12C is a third diagrammatic representation of an authorized access to a liability protection system configuration.

FIG. 12A, FIG. 12B, FIG. 12C and FIG. 13 depict an embodiment 800 of a liability protection system, which may implement a liability protection service. FIG. 12A shows an authorized direct liability creation. That is, if the transaction or access to information is allowed, a subscriber 808 will directly incur some form of liability, usually financial liability. Generally, a subscriber 808 initiates a transaction request 819 to a potential contracting party 810, such as an online retailer of goods or services. The potential contracting party 810 is a party that preferably engages in or has access to an electronic funds transfer (EFT) process. Included with the potential contracting party 810 may be a merchant processor, an application service provider, or both, to effect an electronic funds transfer (EFT). The potential contracting party 810, although depicted and described as an online retailer utilizing an e-commerce engine, may also be a party that operates an automated teller machine (ATM) or a point of sale EFT device. The potential contracting party 810, through its merchant processor, application service provider, or both, transmits an EFT request 821 to an EFT processor operating an EFT switch 812, which then transmits a transaction authorization request 828 to an information holder 804, such as a financial institution. It is to be understood that the information holder 804 may receive the transaction authorization request 828 directly or, in the case of information holders that may not directly store data, through an application service provider. The information holder 804 determines whether the account is flagged for verification. If so, a verification system 802 receives a transactional system verification request 822 from the information holder 804. Upon receiving a transactional system verification request 822 from the information holder 804, the verification system 802 transmits a subscriber verification request 823 to a communication address provided by the subscriber 808 during a registration process. The verification system 802 may receive a subscriber verification response 824 from the subscriber 808 indicating whether the transactional system verification request 822 should be granted or denied. The verification system 802 transmits a transactional system verification response 825 to the information holder 804 that transmitted the transactional system verification request 822. The transactional system verification response 825 indicates to the information holder 804 whether or not the transaction authorization request 828 should be accepted. The information holder 804 may reply to the transaction authorization request 828 with a transaction authorization response 829. The content of the transaction authorization response 829 may depend upon a given information holder's security protocol. Generally, the transaction authorization response 829 may include an indication as to whether the transaction authorization request 828 has been granted or denied. In addition to the responses 825,829 sent by the verification system 802 and the information holder 804, respectively, each may transmit an acknowledgement message (not shown) to the appropriate party, as described above with respect to FIG. 9. Upon receiving the transaction authorization response 829, the EFT switch 812 transmits an EFT response 826 to the potential contracting party 810, indicating whether the EFT request 821 was granted or denied. Since this FIG. 12A depicts an authorized access, it is presumed that the subscriber 808 will have allowed the transaction. The potential contracting party 810 may transmit a transaction response 827 to the subscriber 808 granting the transaction request 819. In this way, direct creation of liability correlated to the subscriber's GID is governed on a timely basis by the subscriber 808. While the description is directed to the information holder 804 communicating with the verification system 802 upon receiving a liability-incurring request, communications 822,825 with the verification system 802 may be carried out at the front end of a transaction by the potential contracting party 810, as shown in FIG. 12B, or even in the middle of the transaction by another intermediary, such as the electronic funds transfer (EFT) switch 812, e.g. a credit switch or debit switch, as shown in FIG. 12C. The EFT switch 812 may communicate 828,829 in custom or industry standard formats over EFT networks such as VISA®, LINK), MASTERCARD®, AMEX®, and DISCOVER® credit networks and/or PLUS®, STAR®, DELTA®, NYCE®, and PULSE® debit networks with the information holder 804, e.g. a financial institution.

Figure 13:
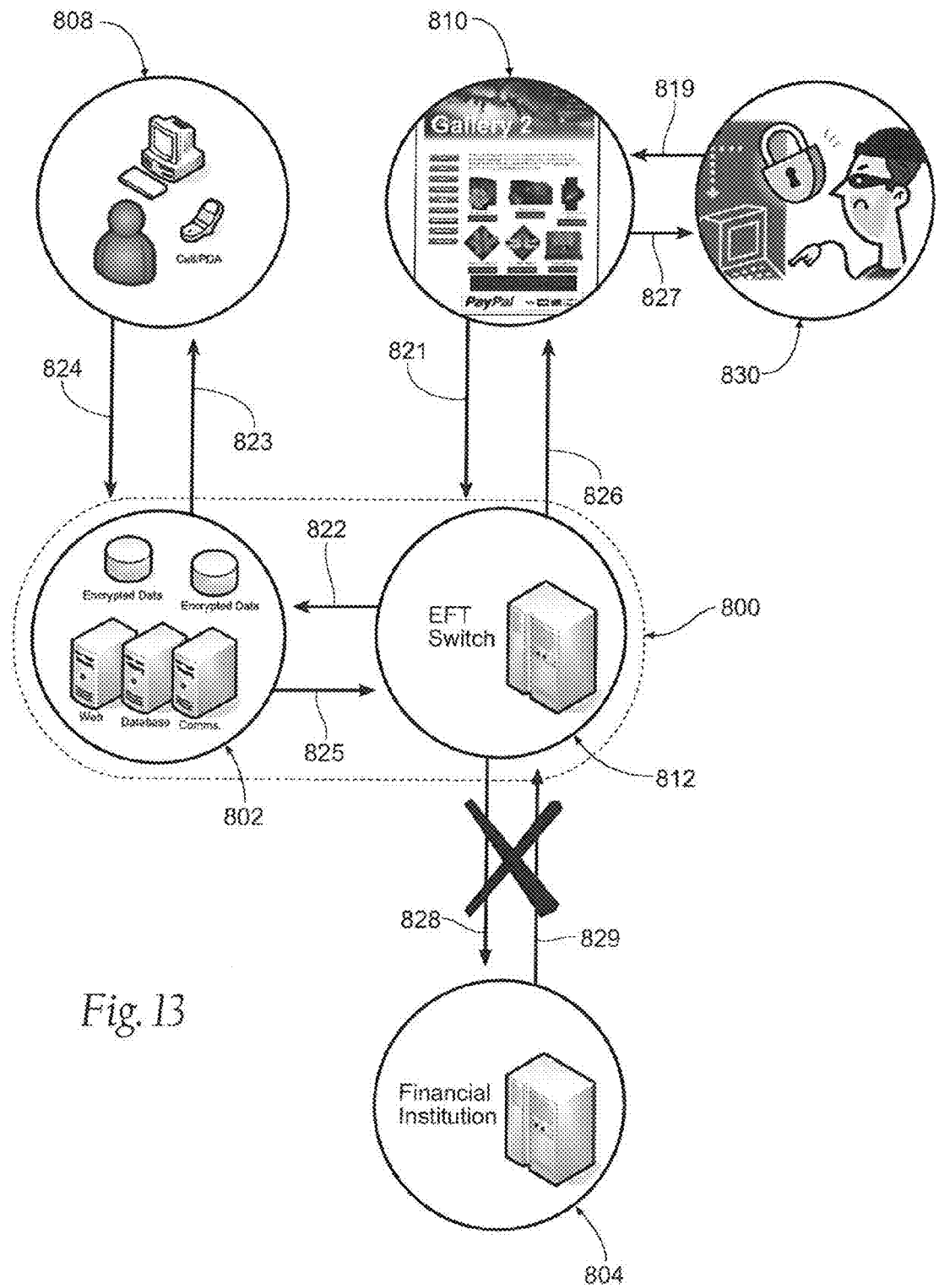
FIG. 13 is a diagrammatic representation of an unauthorized access to the liability protection system configuration shown in FIG. 12C.

FIG. 13 shows an unauthorized direct liability creation attempt. Generally, an unauthorized party 830 initiates a transaction request 819 to a potential contracting party 810, as described above. The potential contracting party 810, through its merchant processor, application service provider, or both, transmits an EFT request 821 to an EFT processor operating an EFT switch 812. In this embodiment, the EFT switch 812 determines whether the account is flagged for verification. If so, a verification system 802 receives a transactional system verification request 822 from the EFT switch 812. Upon receiving a transactional system verification request 822 from the EFT switch 812, the verification system 802 transmits a subscriber verification request 823 to a communication address provided by the subscriber 808 during a registration process. The verification system 802 may receive a subscriber verification response 824 from the subscriber 808 indicating that, in the event of an unauthorized attempt, the transactional system verification request 822 should be denied. The verification system 802 transmits a transactional system verification response 825 to the EFT switch 812 that transmitted the transactional system verification request 822. The transactional system verification response 825 indicates to the EFT switch 812 that the EFT transaction has been denied by the subscriber 808. The EFT switch 812, may reply to the EFT request 821 with an EFT response 826, indicating to the potential contracting party 810 that the transaction is not possible at this time. The content of the EFT response 826 may depend upon a given EFT communication protocol. The potential contracting party 810 may transmit a transaction response 827 to the unauthorized party 830 denying the transaction request 819. In addition to the responses 825,826 sent by the verification system 802 and the information holder 804, respectively, each may transmit an acknowledgement message (not shown) to the appropriate party, as described above with respect to FIG. 9. Thus, in a system where the system verification request 822 and response 825 are conducted before any communication with the information holder 804, the transaction authorization request 828 and the transaction authorization response 829 are never required in the event of the attempted unauthorized access because the attempted unauthorized transaction is intercepted.

Although the information protection systems 800 shown include a verification system 802 in communication with another party, the verification system 802 may stand alone. Alternatively, the information protection system may include various combinations of the verification system 802, the information holder 804, the potential contracting party 810 and the EFT switch 812.

Figure 14:
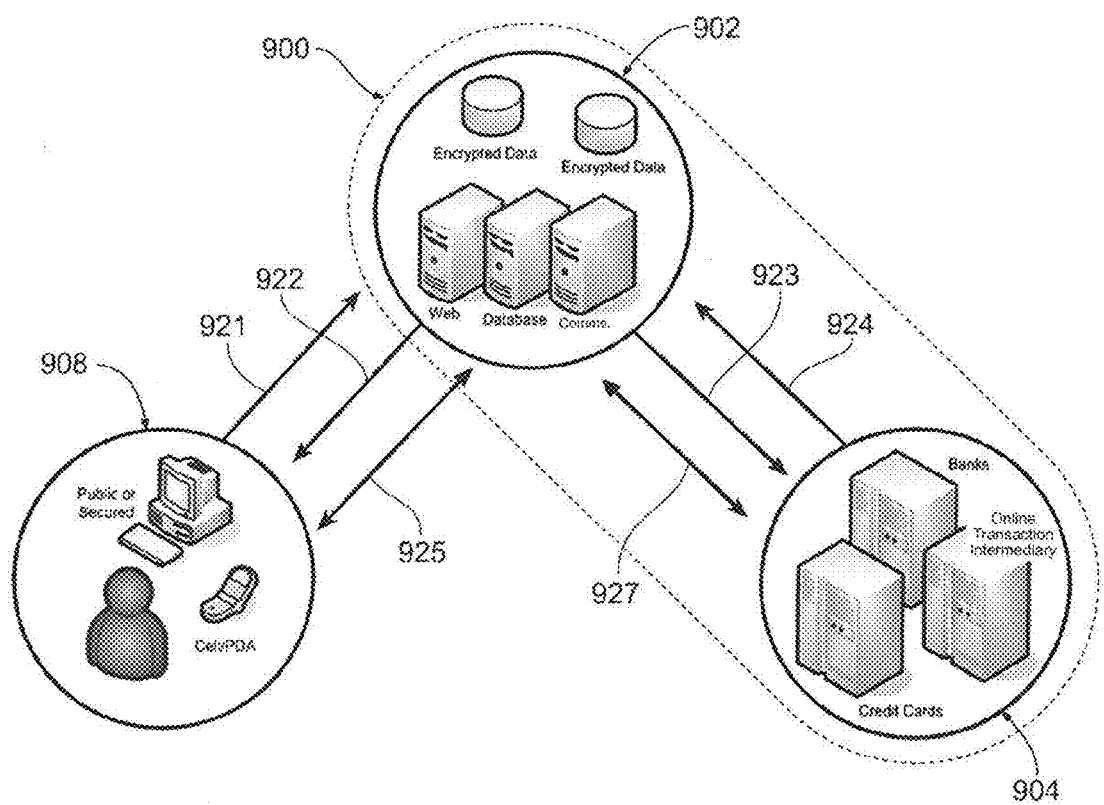
FIG. 14 is a diagrammatic representation of an information access emulation protection system.

FIG. 14 provides an embodiment 900 of an information access emulation protection system. In an information access emulation protection system, all communications external to the system 900 are transferred through a verification system 902. To utilize the system 900, the verification system 902 receives a system login request 921 from a subscriber 908, who had previously registered with the protection service provider that manages the system 900. The login request may include a static client identifier, such as a PSA user name, a variable static client identifier, such as a PSA password and/or a personal identification number (PIN) and/or a dynamic client identifier. The verification system 902 transmits an emulation login authorization 922 to the subscriber 908, thereby establishing an emulation session communication link 925. The emulation session communication link 925 is preferably a communicative channel through which the subscriber 908 may interact with the verification system 902, such as an interactive website. As part of the subscriber's registration process, the subscriber 908 provided website locations and associated user names and user passwords for accounts managed by information holders 904, information related to the accounts being information that the subscriber 908 desires to access through the information access emulation protection system 900. Thus, the verification system 902 may display a list of selectable accounts for emulation. The subscriber 908 selects a desired account, and the verification system 902 transmits an account login request 923 to an information holder 904. Accompanying the account login request 923 are a user name and user password for the selected account. Upon verification of the user name and user password by the information holder 904, the verification system receives an account login confirmation 924, which may be a webpage that can simply be mirrored by the verification system 902 to the subscriber 908 over the established emulation session communication link 925. Over the emulation session communication link 925, the subscriber may interact with selected accounts under the control of the information holders 904.

Returning now to FIG. 1A, during the second sign-up data input step 105, the client selects the desired protection services by, for example, selecting or deselecting associated radio buttons. If desired, the client may be presented with a choice of security levels for one or more of the optional protection services. For instance, one or more of the optional protection services may be available with a plurality of security levels. For example, approval of a verification request may use only a single client identifier, such as a variable static client identifier (VSCI), while approval of verification requests of other protection services may use a plurality of client identifiers, such as both a VSCI and a dynamic client identifier (DCI). A VSCI may be generally understood as a client identifier that may be selectively changed, thus variable, but is not generally changed between each successive use of the identifier, thus static. A DCI, on the other hand, may be generally understood as a client identifier that changes, perhaps several times, between each successive use of the identifier. An example of a DCI is a numeric or alphanumeric code that is periodically altered according to a random code generation algorithm.

The verification system determines 106 which protection services were selected by the client in the prior data input step 105. If the client selected only the information access emulation protection service, the client is taken to a fourth sign-up data input step 109 on the website, at which point the client selects a payment method, as further explained below, for the selected information access emulation protection service.

On the other hand, if the client selected either the information protection service or the liability protection service, the client may proceed to a third sign-up data input step 107 on the website, during which the client provides one or more communication addresses. A communication address is understood to be an address at which the client wishes to receive communications from the verification system, such as verification requests. Examples of communication addresses are mobile or cellular phone numbers, text message addresses, such as e-mail addresses, internet protocol addresses (IP addresses) and other addresses that allow electronic text messages to be sent to devices such as Blackberry® handheld devices, personal digital assistants (PDAs), iPhone® devices, and electronic paging devices, and telephone numbers. If the client enters a plurality of communication addresses, the client may select which communication addresses are active and enabled, and which are disabled. Upon entry of one or more desired communication addresses, the client proceeds to the fourth sign-up data entry step 109 to select a payment method for the services selected.

In the fourth sign-up data input step 109, the client is presented with payment method options. Options for payment include, for example, credit card payment, automatic withdrawal from an account, other electronic funds transfer (EFT) payment options, or invoiced advanced payment. If the client chooses credit card payment, the client may be asked for a credit card number, the card holder name, the card expiration date and/or card verification value (CVV2) code. If the client selects an automatic withdrawal from an account, the client will be prompted to enter a bank routing number, and an associated account number. The client may be further asked to mail a voided check to the protection service provider for verification. If the client selects an invoiced advanced payment, the client may select a subscription term, which may be, for example, one, two or three years. Additionally, the subscription may be offered on a 30-day trial period to continue presuming payment is received. If the client has selected, in the second sign-up data input step 105, a protection service that incorporates the use of a DCI, the client may have the option of requesting expedited shipping of a physical dynamic client identifier device (DCID) to the client.

Another coarse information format check may be conducted to determine whether all of the information requested by the website to be entered in the second sign-up data entry step 105 has been entered and, if so, that the information was entered in a correct format. A client information validation step 111 is executed. At least some of the information entered by the client is validated for accuracy. The validation may include an analysis of the user name, the user password and/or the e-mail address, all of which may have been submitted by the client. In validating the user name, the verification system confirms that the submitted user name is not already in use by another subscriber. The user password may be validated against generally accepted or proprietary password generation formulas, parameters or rules. A formula check may also be run against the e-mail address submitted by the client. Additionally, payment information submitted in the fourth sign-up data input step 109 is validated and processed. If the client selected the credit card method of payment, the charge is preferably directed through an electronic commerce engine, and an order confirmation may be created and displayed for the client to print for the client's records. If validation 111 of all information is achieved, the verification system determines 113 whether or not a physical DCID is to be sent to the client. If validation 111 of any information entered by the client fails, the client is presented with an error message and returned to a data entry step for correction or completion of the invalidated information. Example error messages may reference an invalid user name, an invalid password, an invalid e-mail address, an invalid zip code, an invalid street address, an invalid city, an invalid protection service option, an invalid credit card number, an invalid CVV2 number, an invalid bank routing number and/or an invalid bank account number. For example, in the event of validation failure of initial profile information, the client may be returned to the first sign-up data input step 103 for correction or completion of requested information. Alternatively, if the payment request fails, the client may be returned to the fourth sign-up data input step 109 to complete or correct payment information.

Turning now to FIG. 1B, presuming all information entered by the client has been validated, a PSA is created on behalf of the client, and the verification system will generally execute a few remainder steps to complete the account sign-up process 100A of the online registration process 100. The verification system determines 113 whether or not the selected protection services and/or associated security levels utilize a DCI. If so, as a part of the service selection step 105, the client may have selected whether the client prefers a physical DCI device (physical DCID) or a soft, or virtual, DCI device (virtual DCID), or both. A physical DCID is generally known in the art of information security and comprises an electronic fob or token that is physically distributed to a client. The physical DCID may provide random number generation that is synchronized with a dynamic client identifier validation system. The virtual DCID may be a downloadable software random number executable that instantiates itself on an electronic device to be used by the client. Alternatively, the virtual DCID may even comprise a private randomly generated key, the formula to which is securely transferred to the client. The preferred DCI comprises the synchronized random number generated by the physical or virtual DCID. A determination 114 is made as to whether a physical DCID is to be sent to the client, whether the client will download a virtual DCID, or both. In the event that a physical DCID is to be used, a unique DCID identifier, such as a DCID serial number, is correlated to the client's PSA, and the device is packaged and sent 115 to the client at the post address that was provided by the client previously.

The verification system determines 124 whether the client will be using a virtual DCID. If the client is not going to be using a virtual DCID, or any DCID, the verification system also determines 117 whether the client supplied an e-mail address during the process thus far. If the client provided an e-mail address, an electronic confirmation is sent 119 to the e-mail address provided. The confirmation may include an explanation that the PSA has been created but is not yet active and further steps may be required. Further, the confirmation preferably includes an indication of an expected delivery date of the physical DCID, if such device has been or will be sent to the client. Presuming that the electronic confirmation is transmitted successfully, that is, presuming that the e-mail confirmation is not returned as undeliverable, an activation link is transmitted 123 to the same e-mail address. If an error was encountered in the process of sending or delivering the e-mail confirmation, the client's PSA may be flagged as having an error condition, and the error would be reported to the verification system customer service for follow-up with the client.

The activation link provided in an e-mail to the client is a hyperlink that, when selected by the client, will launch a secure web session in which the client will be able to complete the registration process 100. The activation link may have certain data embedded in the link, itself, such as by way of querystring parameters. An example of embedded data that may be passed with the activation link is a unique subscriber identifier, which informs the verification system as to which client is attempting to complete the registration process 100. Accompanying the activation link may be a message to await the arrival of the physical DCID by post, if such device is to be used 114, prior to continuing on to the account activation process 100B of the online registration process 100. If the client had not provided an e-mail address, as determined 117 by the verification system, a verification request is sent 121 to one or more communication addresses that were entered in the third sign-up data input step 107. The verification request may include a message to continue the registration process 100 which may occur after the arrival of the physical DCID by post, if such device is to be used 114. After either the verification request 121 or the activation link e-mail 123 is received, the client may proceed to the account activation process 100B. If the physical DCID is to be used, the client may wait until such device is received to continue with the registration 100.

If the virtual DCID is to be downloaded by the client, either alone or in addition to the physical DCID being sent, a determination 116 is made as to whether the client supplied an e-mail address. If the client provided an e-mail address, an electronic confirmation is sent 118 to the e-mail address provided. The confirmation may include a virtual DCID executable activation code and an explanation that the PSA has been created but is not yet active and further steps may be required. Presuming that the electronic confirmation is transmitted successfully, that is, presuming that the e-mail confirmation is not returned as undeliverable, a virtual DCID download link is e-mailed 122 to the same e-mail address informing the client how to go about getting the virtual DCID. Additionally, an activation link is transmitted 126 to the same e-mail address. If an error was encountered in the process of sending or delivering the e-mail confirmation, the client's PSA may be flagged as having an error condition, and the error would be reported to the verification system customer service for follow-up with the client.

The activation link provided 126 in an e-mail to the client is preferably a hyperlink that, when selected by the client, will launch a secure web session in which the client will be able to complete the registration process 100. The activation link may have certain data embedded in the link, itself, such as by way of querystring parameters. An example of embedded data that may be passed with the activation link is a unique subscriber identifier, which informs the verification system as to which client is attempting to complete the registration process 100. Accompanying the activation link may be a message to download the virtual DCID, and perhaps await the arrival of the physical DCID by post, if such device is to be used 114, prior to continuing on to the account activation process 100B of the online registration process 100. If the client had not provided an e-mail address, as determined 116 by the verification system, a verification request is sent 120 to one or more communication addresses that were entered in the third sign-up data input step 107. The verification request may include a virtual DCID executable activation code and a message to continue the registration process 100 which may occur after the arrival of the physical DCID by post and/or download of the virtual DCID, if such device is to be used 113. After either the verification request 120 or the activation link e-mail 126 is received, the client may proceed to the account activation process 100B. If the physical DCID is to be used, the client may wait until such device is received to continue with the registration 100. If the virtual DCID is to be used, the client preferably accesses and runs 128 a virtual DCID executable to instantiate a version of the virtual DCID on an electronic device. The virtual DCID executable may be downloaded from a website, or may be provided on the electronic device in firmware or software, preferably disabled. Such instantiation may cause the generation of a unique DCID identifier, which may be generated as a function of date, time and type of electronic device. Alternatively, or additionally, the client may be prompted for his or her VSCI and/or virtual DCID executable activation code, which may be factored into the generation of the unique DCID identifier. The unique DCID identifier may be automatically transmitted to the verification system to be associated with the client's PSA, or the client may be contacted to disclose the unique DCID identifier. If preferred, a client may instantiate a unique virtual DCID on each electronic device that the client will use in communicating with the verification system.

FIG. 2 provides a flow chart of an account activation process 100B of the online registration process 100. At an activation sign-in step 125, upon receiving the verification request 120 or 121 or the confirmation e-mail with activation link 123 or 126, and the physical DCID 115 and/or virtual DCID 128, if a DCID is to be used, the client may sign into a verification system website utilizing the PSA user name and PSA user password created and registered in the account sign-up process 100A of the registration process 100. Such access to the website preferably occurs by the client clicking on the activation link as provided 123 or 126. The verification system validates the entered PSA user name and PSA user password by comparing them to expected values, as may have been determined by the use of querystring parameters provided along with the activation link. If there are any login errors, the client will be informed of such errors, and a three-strikes routine, as described below, may be executed.

At a first activation data input step 127, upon logging into the website, the client is prompted for and inputs a VSCI, such as a PIN, and a static response to a selected security question, and the inputs undergo an edit check by the verification system. The verification system determines 129 whether the selected protection services incorporate the use of a DCI for verification purposes. If the selected protection services do not use a DCI, the client is taken to a fourth activation data input step 141 to enter further information, further described below. If a DCI is to be used with the selected protection services, another determination 132 is made regarding whether a physical DCID is to be used. If so, at a second activation data input step 131, the client may be prompted for and enter the unique DCID identifier, such as the device serial number, associated with the physical DCID received by the client. Next, at a third activation data input step 133, the client is prompted for and enters the DCI that is contemporaneously displayed on, or indicated by, the physical DCID. If a physical DCID is not going to be used, but a virtual DCID is to be used, the client will be prompted for and will enter 134 the unique DCID identifier as generated by the respective instantiated virtual DCID for each electronic device. This step may not be required, if the unique DCID identifiers are transmitted to the verification system automatically upon instantiation, for example. The verification system may prompt the client for and receive from the client 136 the virtual DCI generated by the virtual DCID that is instantiated on the client's preferred electronic device associated with a preferred communication address, which may have been identified when the client provided the communication addresses 107 or when the client provided the unique DCID identifier(s) for the virtual DCID(s) 134. After the unique DCID identifiers and associated DCIs are provided, the verification system determines 135 whether the correct unique DCID identifier and associated DCI have been entered by the client. The verification system may analyze parameters such as the DCI, the client's user name, the unique DCID identifier and/or a time stamp of the entry. To complete the DCI validation, the verification system may access an external dynamic client identifier validation system or the verification system may, itself, possess a DCI algorithm and data to make the comparison. If either the unique DCID identifier or the DCI is incorrect, the verification system enters a three-strikes routine. Upon entering a three-strikes routine, the verification system determines 137 whether an error condition has occurred a predetermined number of times, in this case three. If it is not the third time that the error has occurred, the user is again prompted for and enters requested information. In this case, the user is returned to a second activation data input step 131 or 134 and is again prompted for and enters the unique DCID identifier associated with the DCID. If, on the other hand, the error condition has occurred three times, an error message is displayed to the client and the PSA is locked 139 for a predetermined amount of time. The error message displayed preferably includes a status of the client's PSA and may further include a telephone number to reach a customer service specialist to unlock the locked PSA. Further, the message may display a time for which the PSA will be locked. The client may attempt the account activation process 100B of the registration process 100 at a later time.

At a fourth activation data input step 141, when the client has successfully entered the unique DCID identifier for the DCID and the correct DCI, or if no DCI is to be used, the client is prompted for and enters the client's GID and other pertinent information. Such other pertinent information may include the client's date of birth. The other pertinent information may also include information related to liability accounts, such as credit card accounts, debit accounts, payment intermediary accounts, and bank accounts, for example. Liability account information may include information related to issued credit or debit cards including information that may be stored in the magnetic stripe of a card, such as a bank identification number (BIN), a card verification value (CVV2), magnetic stripe track 1 data, magnetic stripe track 2 data, and/or a personal identification number (PIN). Liability account information may be requested from the client in the event that the client had requested a liability protection service. Prior to continuing the activation process 100B, the verification system updates the client's PSA and performs a coarse format validation of the GID entered by the client. If the GID was entered in an incorrect format, the client will again be prompted for the information.

The verification system also determines 143 whether the information access emulation protection service was selected. If information access emulation protection has not been selected, the activation process 100B is generally complete, as further described below, and the client has become a subscriber of information protection services. At a fifth activation data input step 145, if the information access emulation protection service has been selected, the client is prompted for and enters user names, user passwords and website uniform resource locator (URL) addresses for the websites that the client wishes the verification system to emulate. The verification system performs an initial validation of the information provided by the client. When the activation process 100B is complete, the client may be referred to as a subscriber. Generally, the terms "subscriber" and "client" are used herein interchangeably. The subscriber is informed that the account registration process 100 is complete, and the subscriber is free to log off of the verification system website or view or modify other profile information prior to logging off or being logged off. Upon completion of the registration process 100, the verification system creates data files to be transmitted to various information holders for validation purposes. Alternatively, or additionally, the verification system, itself, may perform validation on user provided data utilizing information available to the public, such as public information databases, even if public access to such information requires payment of a fee. Validation of the information by the information holders may include, for example, a review of the GID provided by the subscriber, a review of the subscriber's designated post address and a review of the subscriber's data of birth information. If any information holder or the verification system detects an anomaly between the information supplied by the subscriber and an expected value, which may have been previously determined to be accurate, an exception report is preferably generated so that contact with the subscriber can be made, and the discrepancies resolved.

Figure 3A:
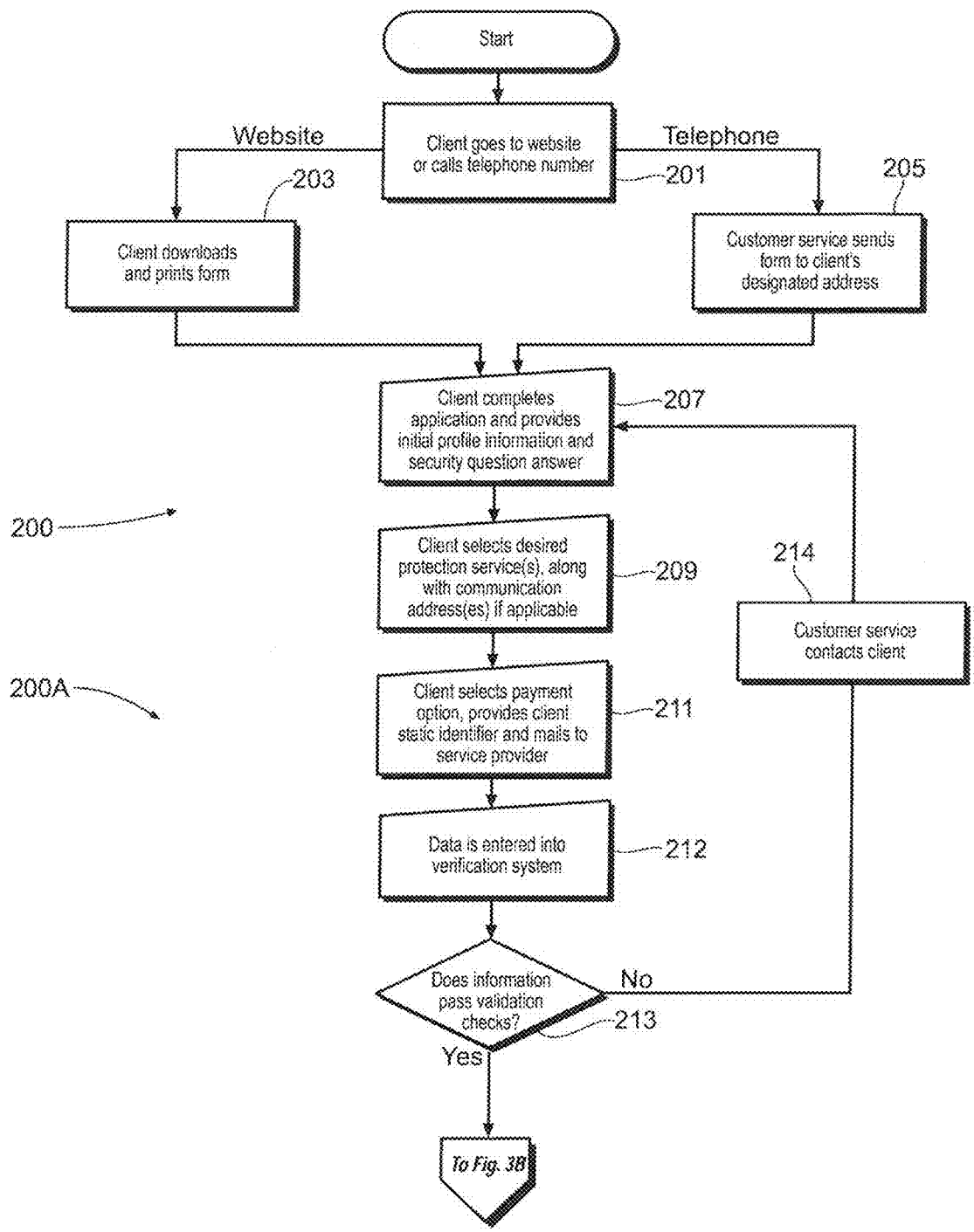
FIGS. 3A and 3B comprise a flow chart of an offline sign-up process of a second client registration process according to the present invention.
Figure 3B:
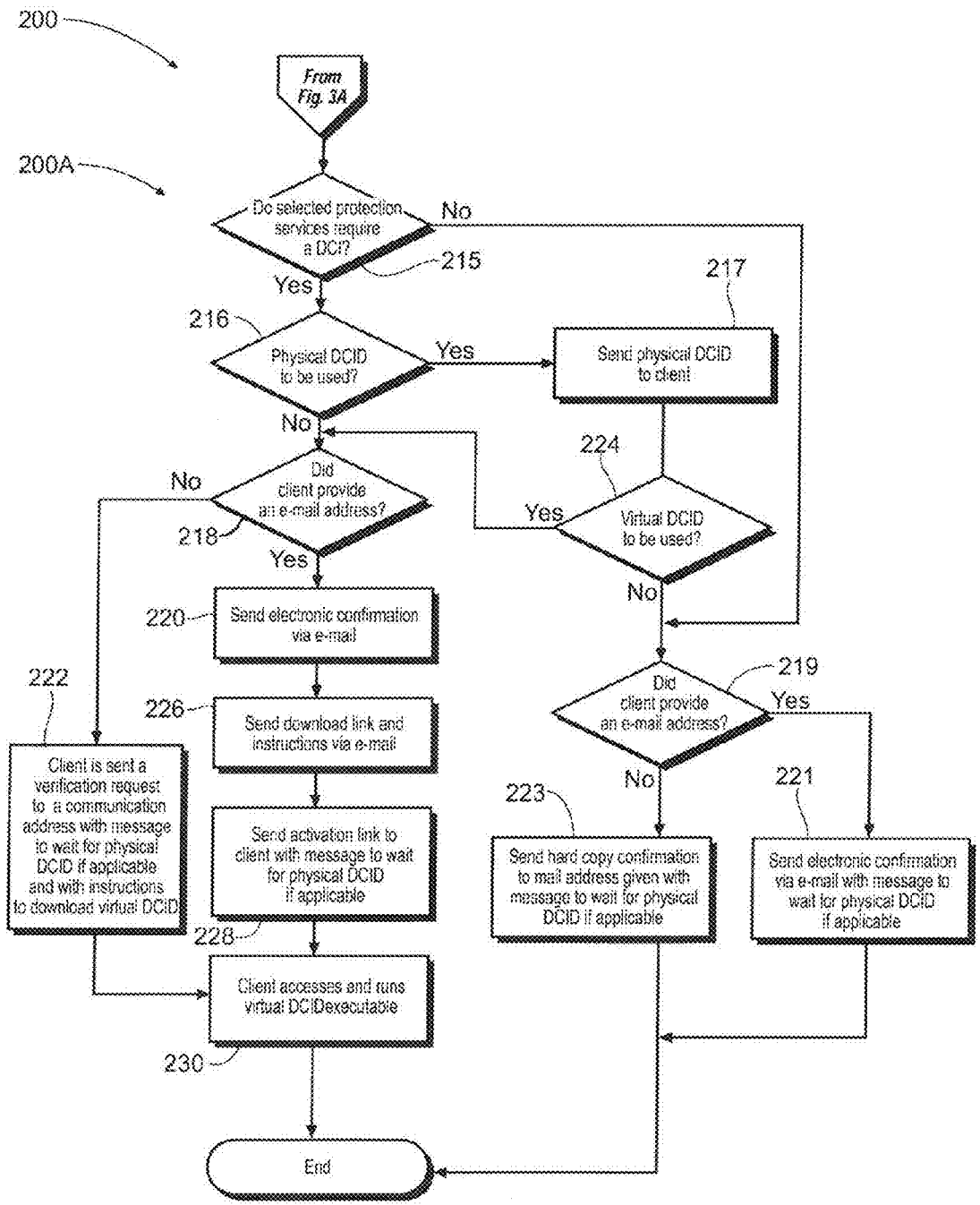
Figure 4:
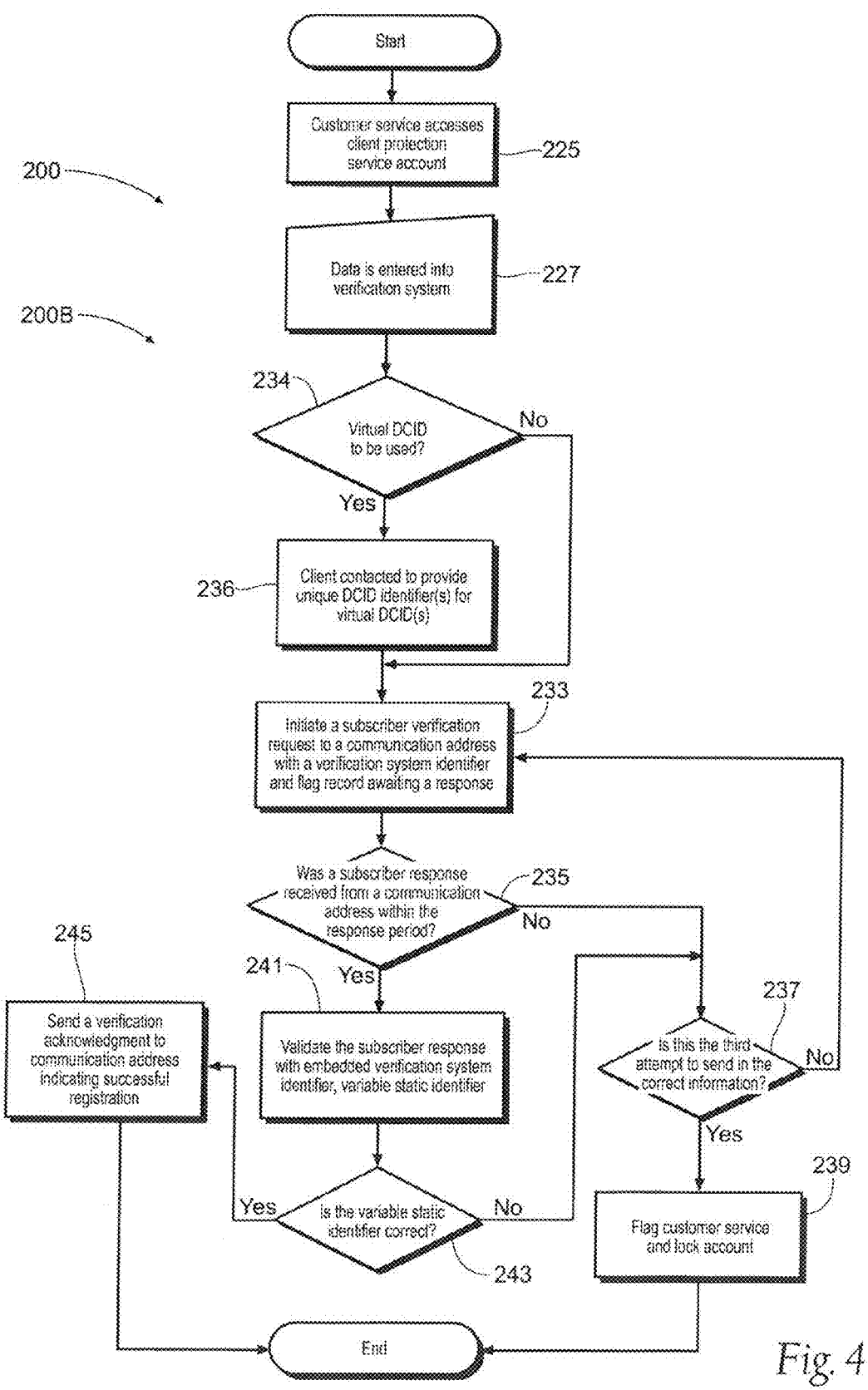
FIG. 4 is a flow chart of an offline activation process of the second client registration process according to the present invention.

While FIG. 1A, FIG. 1B and FIG. 2 relate to an online registration process 100, FIG. 3A, FIG. 3B and FIG. 4 provide a registration process 200 for a client that may not have regular access to the Internet or a client that may not wish to use the online process 100. FIG. 3A and FIG. 3B depict an off-line sign-up process 200A. In this process 200A, at a first step 201, a client may select a method by which to obtain a sign-up form. In one method 203 the client may, through the use of an ICD, access a protection service provider webpage to review information about protection services offered by the provider and to download and print a sign-up form. If the client does not have access to the Internet, or if the client prefers not to use the Internet for sign-up, a second method 205 may be a customer service telephone number that is provided to enable a client request for a sign-up form to be sent to a designated post address or facsimile number. If the protection service provider customer service receives a telephone call from a client requesting an offline sign-up form, a customer service representative will ask the client for a designated post address or facsimile number, and the requested information may be entered into a database and flagged to be sent. The protection service provider may run a daily routine to generate sets of sign-up forms to be sent. Upon sending the requested forms to clients, the database may reflect such status. Upon printing or receiving a sign-up form, the client completes an initial profile information section and provides a static answer to a security question 207 on the form, much like a client provides initial profile information in the first sign-up data entry step 103 in the online sign-up process 100A. Further, like the second sign-up data entry step 105 in the online sign-up process 100A, the client also selects and submits 209 desired information protection services, security levels, and one or more communication addresses, if the indicated information protection services are selected. The client also selects a payment method 211, like the fourth sign-up data input step 109, by which the client will pay for the selected services, provides a client static identifier, such as a PSA user name, and transmits the completed sign-up form to a designated protection service provider post address or facsimile number. A separate page of the sign-up form may request the establishment of a VSCI, such as a personal identification number (PIN), to be used in verifying access to personal information. This separate page may be addressed to and sent to a distinct address from the rest of the sign-up form to help maintain security of the information.

Upon receipt of a completed sign-up form, the protection service provider enters 212 information provided on the received sign-up form. The verification system performs a client information validation step 213. At least some of the information entered by the client is validated for accuracy. The validation may include an analysis of the PSA user name, a PSA user password and/or the e-mail address, all of which may have been submitted by the client on the sign-up form. In validating the PSA user name, the verification system confirms that the submitted user name is not already in use by another subscriber. The PSA user password may be validated against generally accepted or proprietary password generation formulas, parameters or rules. A formula check may also be run against the e-mail address submitted by the client. Additionally, payment information is validated and processed. If the client selected the credit card method of payment, the charge is preferably directed through an electronic commerce engine, and an order confirmation may be created. If validation 213 of all information is achieved, the verification system determines 215 whether or not a physical DCID is to be sent to the client. If validation 213 of any information entered by the client fails, the client may be contacted 214 at a designated telephone number by a customer service representative of the protection service provider. Example errors may include an invalid user name, an invalid password, an invalid e-mail address, an invalid zip code, an invalid street address, an invalid city, an invalid protection service option, an invalid credit card number, an invalid CVV2 number, an invalid bank routing number and/or an invalid bank account number.

Presuming all information submitted by the client has been validated, a PSA is created on behalf of the client, and the verification system will generally execute a few remainder steps to complete the account sign-up process 200A of the offline registration process 200. The verification system determines 215 whether or not the client will be using a DCI. Turning now to FIG. 3B, in the event that a physical DCID is to be used 216, a unique DCID identifier, such as a device serial number, is correlated to the client's PSA, and the physical DCID is packaged and sent 217 to the client at a post address that was provided by the client previously. The verification system determines 224 whether the client will be using a virtual DCID. If the client is not going to be using a virtual DCID, or any DCID, the verification system also determines 219 whether the client supplied an e-mail address. If the client provided an e-mail address, an electronic confirmation is sent 221 to the e-mail address provided. The confirmation may include an explanation that the PSA has been created but is not yet active and further steps may be required. Further, the confirmation preferably includes an indication of an expected delivery date of the physical DCID, if such device has been or will be sent to the client. The sign-up form may also provide an option for a client to continue the registration process online, such as by way of the online activation process 100B. If the client desires online activation 100B, an activation link, as described above in connection with the online sign-up process 100A, may also be transmitted to the client provided e-mail address. If an error was encountered in the process of sending or delivering the e-mail confirmation 221, the client's PSA may be flagged as having an error condition, and the error may be reported to the protection service provider customer service for follow-up with the client.

If the client had not provided an e-mail address, a hard copy confirmation is sent 223 to the post address provided by the client. The hard copy confirmation may include a message to continue the registration process 200 which may occur after the arrival of the physical DCID by post or download of the virtual DCID, if such device is to be used 215.

If the virtual DCID is to be downloaded by the client, either alone or in addition to the physical DCID being sent, a determination 218 is made as to whether the client supplied an e-mail address. If the client provided an e-mail address, an electronic confirmation is sent 220 to the e-mail address provided. The confirmation may include a virtual DCID executable activation code and an explanation that the PSA has been created but is not yet active and further steps may be required. Presuming that the electronic confirmation is transmitted successfully, that is, presuming that the e-mail confirmation is not returned as undeliverable, a virtual DCID download link is e-mailed 226 to the same e-mail address informing the client how to retrieve or activate the virtual DCID. Additionally, an activation link is transmitted 228 to the same e-mail address. If an error was encountered in the process of sending or delivering the e-mail confirmation, the client's PSA may be flagged as having an error condition, and the error would be reported to the verification system customer service for follow-up with the client.

The activation link provided in an e-mail to the client is preferably a hyperlink that, when selected by the client, will launch a secure web session in which the client will be able to complete the registration process, using the online activation process 100B. The activation link may have certain data embedded in the link, itself, such as by way of querystring parameters. An example of embedded data that may be passed with the activation link is a unique subscriber identifier, which informs the verification system as to which client is attempting to complete the registration process. Accompanying the activation link may be a message to download the virtual DCID and perhaps await the arrival of the physical DCID by post, if such device is to be used 216, prior to continuing on to the account activation process 100B of the online registration process 100. If the client had not provided an e-mail address, as determined 218 by the verification system, a verification request is sent 222 to one or more communication addresses that were submitted by the client. The verification request may include a virtual DCID executable activation code and a message to continue the registration process 200 which may occur after the arrival of the physical DCID by post, if such device is to be used 216, or after the download of the virtual DCID. After either the verification request 222 or the activation link e-mail 228 is received, the client may proceed to the account activation process 100B or 200B. If the physical DCID is to be used, the client may wait until such device is received to continue with the registration. If the virtual DCID is to be used, the client preferably accesses and runs 230 a virtual DCID executable to instantiate a version of the virtual DCID on an electronic device. The virtual DCID executable may be downloaded from a website, or may be provided on the electronic device in firmware or software, preferably disabled. Such instantiation may cause the generation of a unique DCID identifier, which may be generated as a function of date, time and type of electronic device. Alternatively, or additionally, the client may be prompted for his or her VSCI and/or virtual DCID executable activation code, which may be factored into the generation of the unique DCID identifier. The unique DCID identifier may be automatically transmitted to the verification system to be associated with the client's PSA, or the client may be contacted to disclose the unique DCID identifier. If preferred, a client may instantiate a unique virtual DCID on each electronic device that the client will use in communicating with the verification system.

FIG. 4 provides an offline activation process 200B. It should be noted that the online registration process 100 is not necessarily mutually exclusive from the offline registration process 200. For example, a client may proceed from the offline sign-up process 200A to the online activation process 100B to complete a registration. For example, an activation link may be transmitted to a client's e-mail address at the end of the sign-up process 200A, much like the activation link transmission 123 in the online sign-up process 100A. However, if the client did not provide an e-mail address in the sign-up process 200A, the protection service provider will access 225 the PSA that has been created for the client and may, at a first customer service data input step 227, enter information provided by the client on the sign-up form. For instance, the protection service provider customer service may enter the VSCI submitted by the client and associate it with the client PSA. The entering of the VSCI submitted by the client is preferably performed by a different customer service representative than that doing the initial profiled data entry 212. Additionally, customer service may enter and associate the static response to the security question submitted by the client. Further, the GID, date of birth and other information submitted by the client is entered into the verification system or associated database. Also, customer service may enter user provided website names, URLs, account names and account passwords if the information access emulation protection service was selected by the client.

The verification system determines 234 whether a virtual DCID is to be used by the client. If so, the client may be contacted 236 to provide the unique DCID identifier that was created upon instantiation of the virtual DCID on the client's electronic device. This step may not be required, if the unique DCID identifiers are transmitted to the verification system automatically upon instantiation, for example. The protection service provider uses the verification system to initiate 233 a verification request to one or more communication addresses. The verification request includes reference to a verification system identifier and the PSA may be flagged as awaiting a verification response from the client and a verification response period may be determined. A verification response period may be a predetermined amount of time that the verification system is willing to wait for a response to the verification request. This response period may be a standard time, regardless of client or method of communication to the communication address to which the verification request was sent. Alternatively, the response period may be a function of the method of communication. In other words, a response period for a verification request that was e-mailed to an e-mail address may be different than a response period for a verification request that was initiated by an interactive voice response unit to a telephone number. Alternatively, or additionally, the client may select or enter the desired response period that falls within a range that is acceptable and provided by the verification system. The response period for a given verification request preferably expires at the earlier of the elapse of the predetermined amount of time and the receipt of a verification response.

Upon the receipt of a verification response, or the elapse of the response period, the verification system makes a determination 235 as to whether a verification response was received. If a verification response was not received from the client, a three strike routine 237 may be entered, upon the exhaustion of which, the protection service provider is informed 239 of such error and a customer service representative may contact the client to resolve the error, such as an incorrect communication address involving transposed numbers, for example. Alternatively or additionally, the verification system may send a status confirmation to the client indicating that the PSA has been locked and providing a telephone number for the client to call to resolve the matter with the protection service provider. If the verification system determines 235 that a verification response was received by the client, the verification system performs a verification response validation 241, 243 of the verification system identifier, the received VSCI, and DCI if applicable. If any of the received information is not validated as accurate, the three strikes routine 237 is entered. If all received information is validated, the verification system transmits 245 a verification acknowledgment to one or more communication addresses indicating that the registration process 200 is complete. When the activation process 200B is complete, the client may be referred to as a subscriber. The subscriber is informed that the account registration process 200 is complete. Upon completion of the registration process 200, the verification system creates data files to be transmitted to various information holders for validation purposes. Alternatively, or additionally, the verification system, itself, may perform validation on user provided data utilizing information available to the public, such as public information databases, even if public access to such information requires payment of a fee. Validation of the information by the information holders may include, for example, a review of the GID provided by the subscriber, a review of the subscriber's designated post address and a review of the subscriber's data of birth information. If any information holder or the verification system detects an anomaly between the information supplied by the subscriber and an expected value, which may have been previously determined to be accurate, an exception report is preferably generated so that contact with the subscriber can be made, and the discrepancies resolved.

Figure 5:
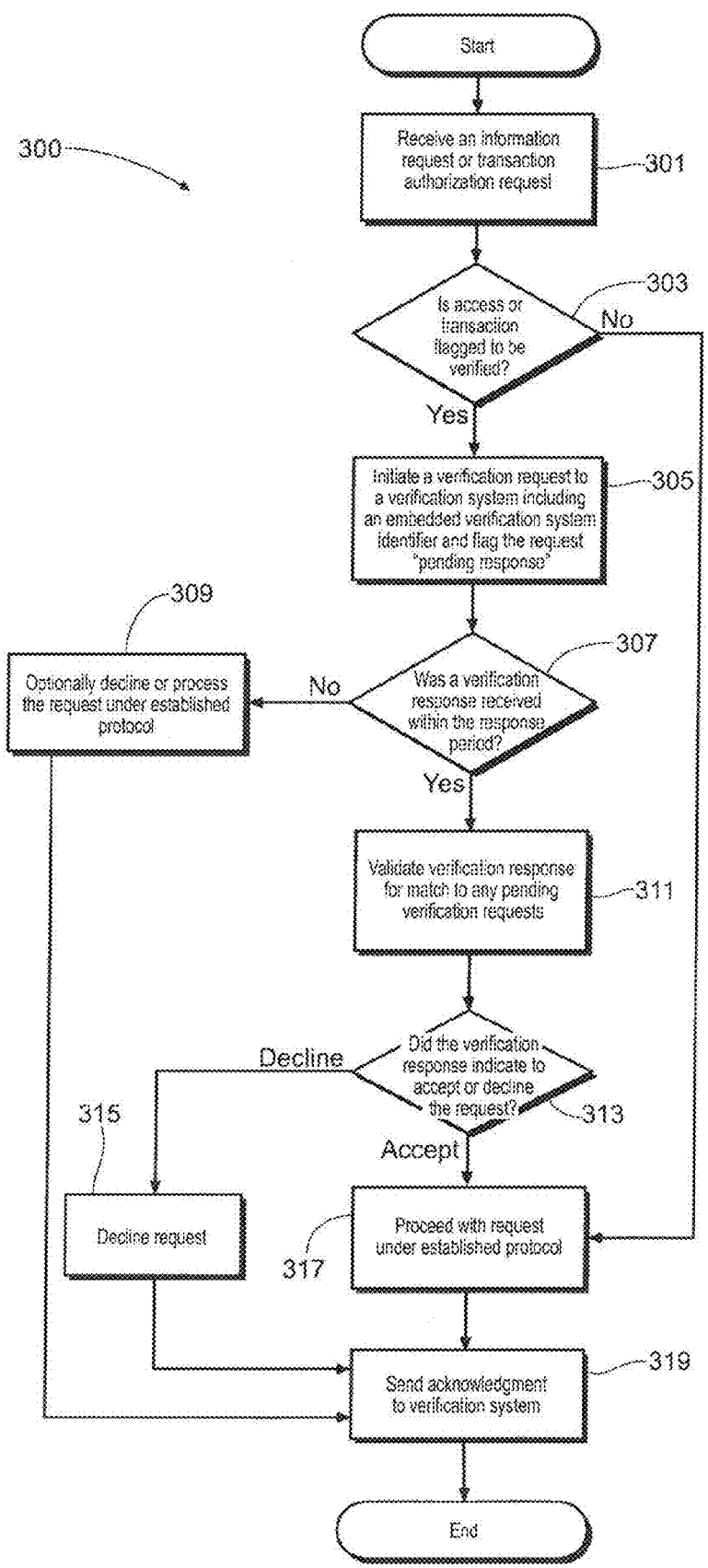
FIG. 5 is a flow chart of an information access control process according to the present invention as executed by an information holder, a potential contracting party, or a transaction intermediary.

FIG. 5 provides an embodiment 300 of a method according to the present invention that may be executed by an information holder. The method 300 will be described with reference also to the information access protection system 700 of FIG. 9, as an example. At a first information request step 301, an information holder 704 receives an information request 721 for information correlated to a GID. The request 721 may be one for a credit score, credit history, and/or to grant access to an account such as online bank accounts, online credit card accounts and online transaction intermediary accounts, such as bill payment accounts. The information holder 704 makes a determination 303 as to whether access to the information requested by the information request 721 must be verified. If access need not be verified, the information holder 704 proceeds 317 with processing the request under its own established protocol relationship between the information holder and the person associated with the GID and in accord with established rules and regulations. If, on the other hand, access to the requested information is flagged for verification, the information holder 704 transmits 305 an access system verification request 722 to a verification system 702. The transmitted request 722 may include an embedded identifier for the verification system, and the request may be logged and flagged as "pending response."

The information holder 704 waits up to a predetermined response period of time and determines 307 whether an access system verification response 725 was received from the verification system 702. If no access system verification response 725 was received prior to the expiration of the predetermined response period, the "pending response" flag is removed and the information holder 704 optionally declines or processes 309 the information request 721 by transmitting an information response 726 to the requestor 706, depending upon established protocol. If an access system verification response 725 is received from the verification system 702 within the predetermined response period, the "pending response" flag is removed and the information holder 704 validates and associates 311 the verification system response, such as by checking the verification system identifier that was transmitted with the request 722 to the verification system 702.

The information holder 704 examines a response identifier to determine 313 whether the access system verification response 725 indicated an acceptance or declination of the system verification request 722. If the request 722 is indicated to the information holder 704 as declined, the information holder 704 transmits 315 an information response 726 to the requestor 706, informing the requestor 706 that the information request 721 may not be processed at this time. If the request 722 is indicated to the information holder 704 as accepted, the information holder 704 transmits 317 an information response 726 to the requestor 706, informing that the request 721 has been approved and also supplying the information held by the information holder in correlation to the GID. After transmitting 315 or 317 a message to the requestor 706, the information holder 704 transmits 319 an information acknowledgment 727 to the verification system 702, informing the verification system that the information request 721 was declined or was processed. An information holder 704 may process a single request 721 at a time, but the holder 704 preferably queues requests 721 so that a plurality of requests 721 may be pending at any given time.

While FIG. 5 has focused on communications between an information holder and a verification system, it should be understood that the same request/response 722,725 communications may be undertaken with a potential contracting party or a transaction intermediary, as represented in FIG. 12B and FIG. 12C, respectively.

Figure 6:
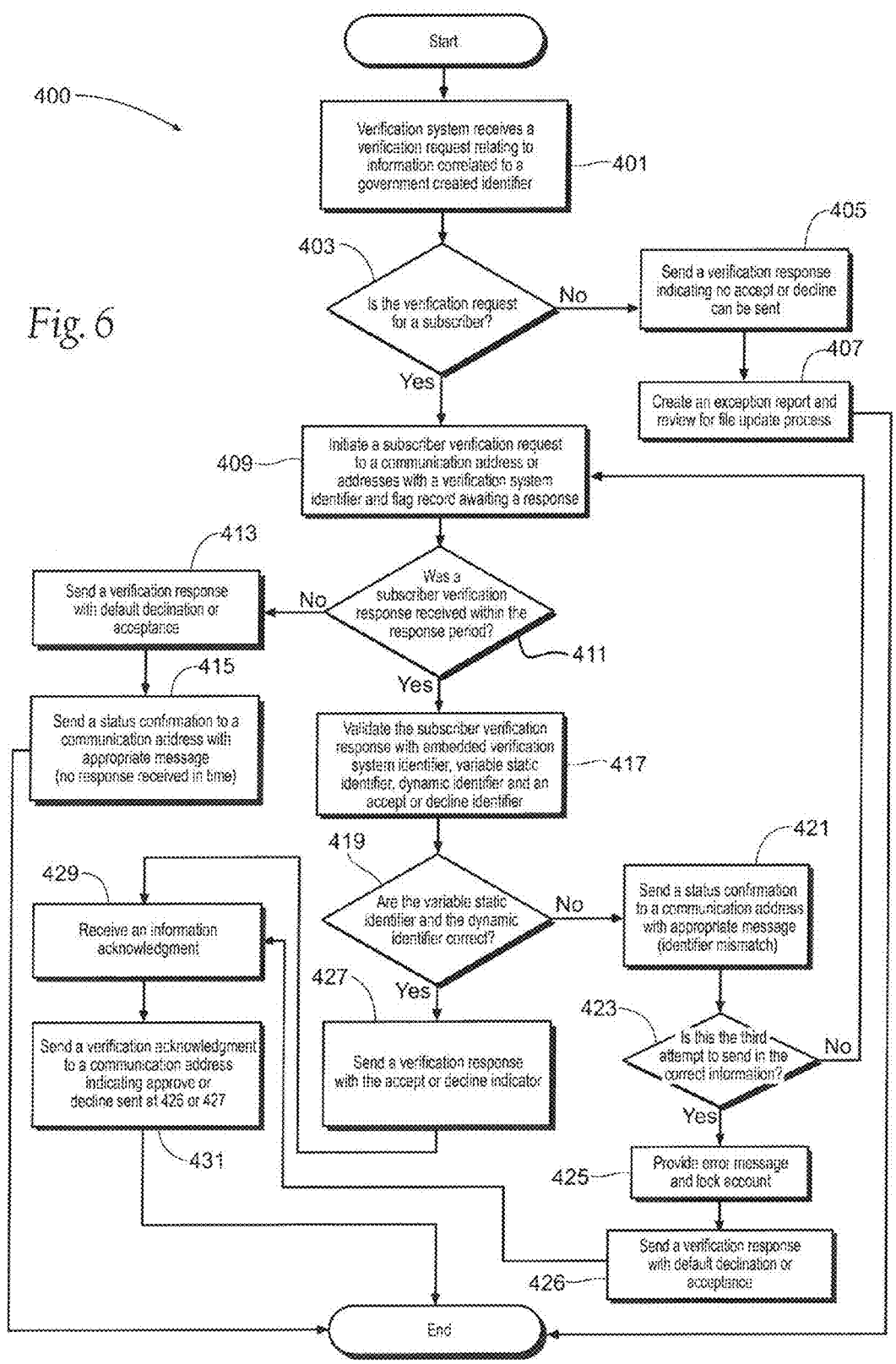
FIG. 6 is a flow chart of an information access control process according to the present invention as executed by a verification system.

FIG. 6 provides an embodiment 400 of a method according to the present invention that may be executed by a verification system upon receiving a request for verification. While the method generally applies to any information protection system or liability protection system, the method 300 will be described with reference also to the liability protection system 800 of FIG. 12C, as an example. The general message sequence of FIG. 12C is described, with the method of FIG. 6 described in connection with the verification system 802. A transaction request 819 is initiated to a potential contracting party 810, as described above. Such transaction request 819 may originate with a subscriber 808 to liability protection services, in the event of an authorized attempt to create liability. Alternatively, an unauthorized transaction request 819 may be received from an unauthorized party 830, such as that shown in FIG. 13. Returning to FIG. 12C, upon receiving the transaction request 819 from outside of the liability protection system 800, the potential contracting party 810, through its merchant processor, application service provider, or both, transmits an EFT request 821 to an EFT processor operating an EFT switch 812. The EFT switch 812 determines whether such transaction must be verified by a subscriber 808. If the transaction need not be verified, the EFT switch 812 proceeds with processing the request under its own established protocol relationship with the information holder 804 and in accord with established rules and regulations. If, on the other hand, access to the requested information is flagged for verification, the EFT switch 812 transmits a transactional system verification request 822 to a verification system 802. The verification system 802 receives 401 the transactional system verification request 822 from the EFT switch 812. The transmitted transactional system verification request 822 may include an embedded subscriber identifier. The verification system 802 determines 403 whether the subscriber identifier in the transactional system verification request 822 corresponds to a subscription that is in effect for a subscriber 808. If there is no current subscription corresponding to the transactional system verification request 822, the verification system 802 transmits 405 a transactional system verification response 825 to the EFT switch 812 indicating that no acceptance or declination may be determined for the associated transactional system verification request 822. The verification system 802 may also generate 407 an exception report to log the transactional system verification request 822 that did not correspond to a subscriber 808. The exception report may be reviewed at a later time by the protection service provider for quality assurance or other purposes. The EFT switch 812 proceeds with processing the request under its own established protocol relationship with the information holder 804 and in accord with established rules and regulations.

If, on the other hand, the transactional system verification request 822 corresponds to an existing subscriber 808, the verification system 802 transmits 409 a subscriber verification request 823 to the corresponding subscriber 808 at a communication address, or plurality of addresses, that was provided by the subscriber 808. A record of the transmitted request 823 may be created and stored by the verification system 802. The record may include the subscriber identifier, the nature of the received transactional system verification request 822, and the date and/or time of the transmission 409 of the subscriber verification request 823. The transmitted request 823 may include an embedded identifier for the verification system, and the request may be logged and flagged as "pending response."

The verification system 802 waits up to a predetermined period of time for a reply from the subscriber 808 and determines 411 whether a subscriber verification response 824 was received from the subscriber 808. If no subscriber verification response 824 was received prior to the expiration of the predetermined response period, the verification system 802 transmits 413 a transactional system verification response 825 to the EFT switch 812 with a default indicator, preferably indicating declination of the transactional system verification request 822, informing the EFT switch 812 that it should decline the EFT request 821. This may be referred to as a required acceptance method of approval. In other words, absent a subscriber verification response 824 indicating acceptance, the verification system 802 will indicate to the EFT switch 812 a declination of the transactional system verification request 822. While this is the preferred method of operation of the verification system 802, a required declination method may also be employed. In that case, absent a subscriber verification response 824 indicating declination, the verification system 802 will indicate to the EFT switch 812 an acceptance of the transactional system verification request 822. In addition to the transactional system verification response 825 sent to the EFT switch 812, the verification system 802 may also transmit 415 a status confirmation message to the subscriber 808 at one or more communication addresses with a status message, such as a message indicating that no response was received within the predetermined response period. If a subscriber verification response 824 is received from the subscriber 808 within the predetermined response period, the "pending response" flag is removed and the verification system 802 validates and associates 417 the subscriber verification response, such as by checking the verification system identifier that was transmitted with the subscriber verification request 823 to the subscriber 808.

Upon receiving the subscriber verification response 824, the verification system validates 417 the response 824. The verification system 802 compares a received verification system identifier, VSCI, and DCI, if used, against expected values. The verification system identifier embedded in the subscriber verification response 824 should match the verification system identifier that was embedded in the subscriber verification request 823. The VSCI should match a prior VSCI established between the subscriber 808 and the verification system 802. The DCI, if used, should match an expected value determined by synchronizing to a dynamic client identifier validation system. In comparing 419 the VSCI and the DCI provided in the subscriber verification response 824, if either does not match the expected value, a status confirmation message is generated and transmitted 421 to one or more communication addresses with a status message. The status message may indicate that the received client identifiers did not match expected values. A three-strikes routine 423 may be executed to allow the subscriber 808 to retry the response, after the verification system 802 returns to initiate 409 another subscriber verification request 823. If three attempts have already been made, the verification system 802 preferably locks 425 the PSA and transmits a status confirmation message to the subscriber 808 indicating that a default response will be transmitted to the EFT switch 812, indicating that the PSA has been locked and requesting that the subscriber 808 contact the protection service provider or related customer service. Preferably after locking the PSA, the verification system 802 proceeds to transmit 426 a transactional system verification response 825 to the EFT switch 812 indicating the default declination or acceptance. The verification system 802 may receive 429 an information acknowledgment, indicating receipt of the transactional system verification response 825. Also, the verification system 802 may transmit 431 a verification acknowledgment to the subscriber 808 at one or more communication addresses indicating one of an approval and a declination were sent to the EFT switch 812.

Presuming that the VSCI and DCI have been validated, the verification system 802 transmits 427 a transactional system verification response 825 to the EFT switch 812 from which the transactional system verification request 822 was received. The transactional system verification response 825 sent after validation indicates to the EFT switch 812, ultimately, whether the EFT request 821 should be accepted or denied. In addition to sending the transactional system verification response 825, the verification system 802 may also receive 429 an information acknowledgment (not shown) from the EFT switch 812. Also, the verification system 802 may transmit 431 a verification acknowledgment (not shown) to the subscriber 808 at one or more communication addresses indicating one of an approval and a declination were sent to the EFT switch 812. A verification system 802 may process a single request 822 at a time, but the system 802 preferably queues requests 822 so that a plurality of requests 822 may be pending at any given time.

Figure 7:
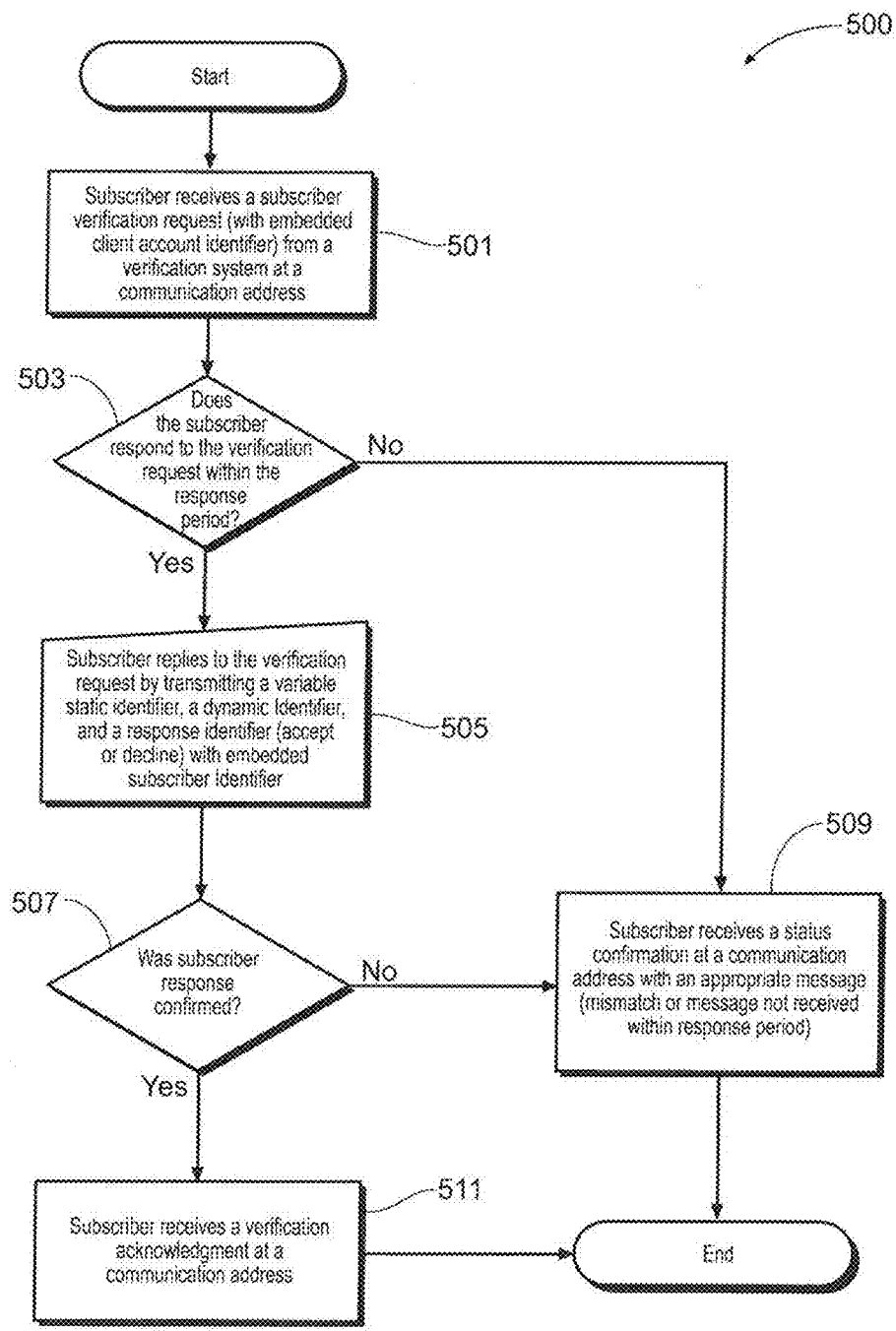
FIG. 7 is a flow chart of an information access control process according to the present invention as executed by a client.

FIG. 7 provides an embodiment 500 of a method according to the present invention that may be executed by a registered subscriber upon receiving a subscriber verification request from an information access or liability protection system. While the method 500 generally applies to any information protection system or liability protection system, the method 500 will be described with reference also to the information access protection system 750 of FIG. 10, as an example. In this example, an information request 771 was submitted to an information holder 754 to obtain information correlated with a GID. The request 771 may have originated with the subscriber 758 or with an unauthorized party 760 as shown in FIG. 11. Returning to FIG. 10, and the method in FIG. 7, the subscriber 758 receives 501 a subscriber verification request 773. The request 773 may include a description of the verification request being made and information as to which information holder 754 originated the request. Further, the request 773 may inform the subscriber 758 of a predetermined response time within which a subscriber verification response 774 must be received by the verification system 752. The subscriber 758 receives the subscriber verification request 773 at one or more active communication addresses that were previously provided to the information access protection system 750. The subscriber 758 decides 503 whether to reply to the subscriber verification request 773. If not, the subscriber 758 may receive 509 a status confirmation message at one or more communication addresses with an status message, which may indicate that a subscriber verification response was not received. If the subscriber 758 decides 503 to reply to the subscriber verification request 773, the subscriber 758 transmits 505 a subscriber verification response 774 to the verification system 752. The subscriber verification response 774 may include a VSCI, a DCI and a response identifier, which indicates whether the subscriber 758 wishes to accept or decline, ultimately, the information request 771. Optionally, the method 500 may end at this point. However, it is preferred to have a further status confirmation message received 509 or 511 by the subscriber 758. For instance, if all information contained in the subscriber verification response 774 is validated by the verification system 752, a verification acknowledgment status confirmation (not shown) may be received 511 by the subscriber 758 indicating that the acceptance or declination was transmitted to the information holder 754. If there are problems with validating the subscriber verification response 774, the subscriber 758 may be informed 509 of a client identifier mismatch, for example.

Although the method embodiments in FIG. 5, FIG. 6 and FIG. 7 have been disclosed and described with reference to the systems in FIG. 9, FIG. 12C and FIG. 10, respectively, it is to be understood that the methods should not be limited to use with such systems: the descriptions are merely representative.

Figure 8:
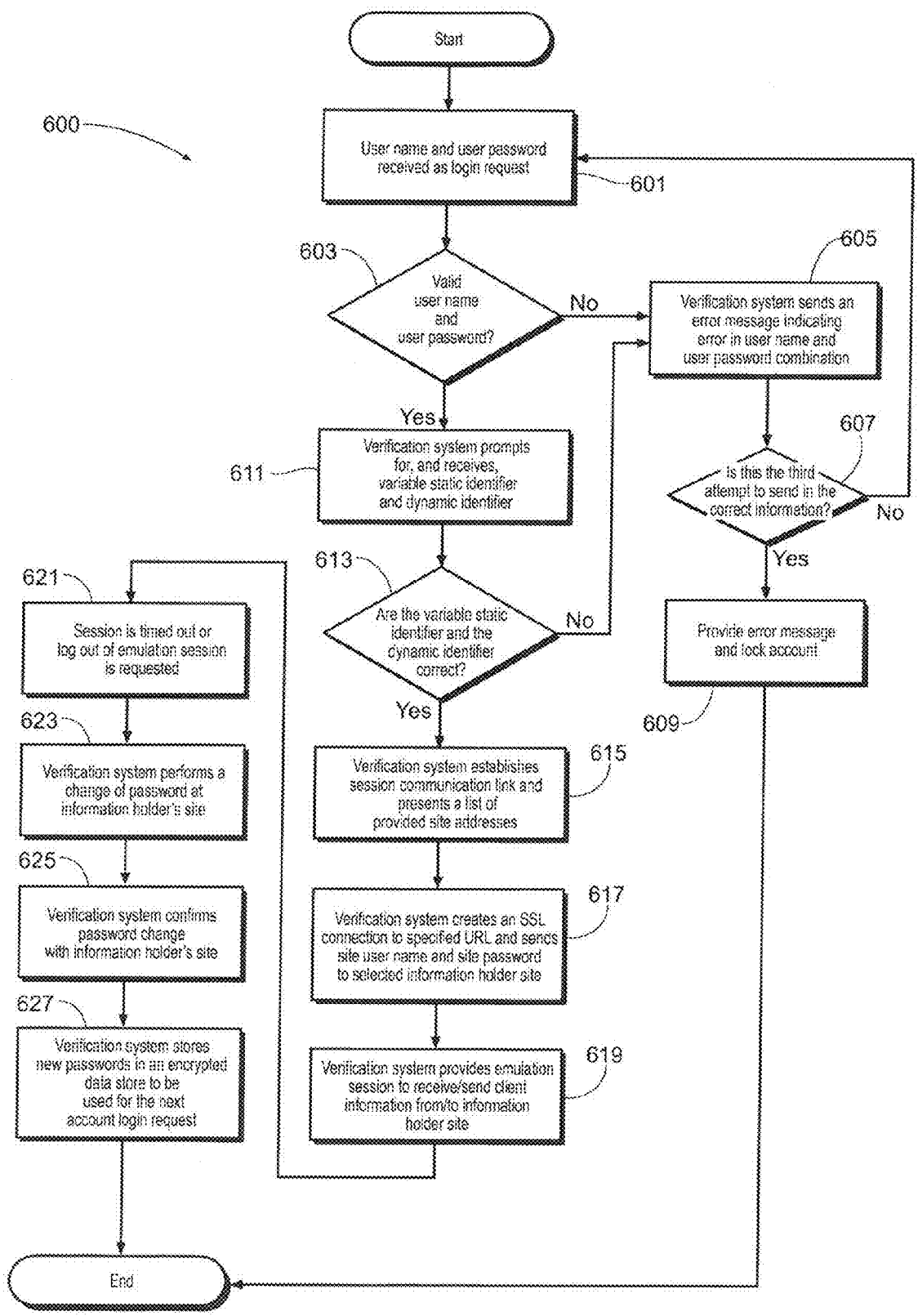
FIG. 8 is a flow chart of an information access control process according to the present invention as executed by a verification system implementing an information access emulation protection service.

FIG. 8 is an embodiment 600 of a method according to the present invention that may be executed by an information access emulation protection system. The method 600 will be described with reference also to the information access emulation protection system 900 of FIG. 14, as an example. Generally, all communications external to the system 900 are preferably handled by a verification system 902. In the method 600, the verification system 902 receives 601 a login request 921 from outside of the emulation protection system 900, from a subscriber 908, for example. The receipt of the login request 921 generally includes the receipt of an emulation system user name and emulation system user password, which may be a PSA user name and a PSA user password, respectively. The verification system 902 validates 603 the received emulation system user name and emulation system user password. If the validation 603 is not successful, the verification system 902 transmits 605 an error message to the party attempting to login and a three-strikes routine 607 is executed, to allow further login requests 601. If the emulation user name and emulation password are validated 603, the verification system 902 prompts for and receives 611 a VSCI and a DCI. Upon receiving 611 VSCI and the DCI, the verification system 902 validates 613 the information. The verification system 902 compares the received VSCI and DCI against expected values. The VSCI should match a prior VSCI established between the subscriber 908 and the verification system 902. The DCI should match an expected value determined by synchronizing to a dynamic client identifier validation system. In comparing 613 the VSCI and the DCI provided to the system 900, if either does not match the expected value, a status confirmation message is generated and transmitted 605, perhaps to a subscriber e-mail address or simply displayed to the party attempting access, such as the subscriber 908. The status message may indicate that the received client identifiers did not match expected values or that there was simply an error in the emulation user name and emulation password combination. A three-strikes routine 607 may be executed to allow repetition of the login request 921. If three attempts have already been made, the verification system 902 preferably locks 609 the PSA and transmits a status confirmation message to the subscriber 908 requesting that the subscriber 908 contact the protection service provider or related customer service.

Presuming that the VSCI and DCI have been validated, the verification system 902 may transmit a system login confirmation 922 to the subscriber 908 and establish 615 an emulation session communication link 925. In establishing 615 the emulation session communication link 925, the verification system 902 may present the subscriber 908 with a list of online accounts and/or associated uniform resource locators (URLs) from which the subscriber 908 may select an emulated access. Upon receiving a selection of one of the URLs or accounts from the subscriber 908, the verification system 902 initiates 617 preferably a secure connection to the selected URL and transmits an information account login request 923 to an information holder 904. Such secure connection may be by way of a secure socket layer (SSL) connection, for example. The information account login request 923 includes an account user name and an initial account password to attempt a login to an information account controlled by the information holder 904. The verification system 902 may receive an information account login confirmation 924 from the information holder 904. A successful information account logon establishes an information account communication link 927 between the verification system 902 and the information holder 904. Through the use of the information account communication link 927 and the emulation session communication link 925, the verification system 902 provides 619 an emulation session to allow the subscriber 908 to interact with the information account held by the information holder 904. After a period of inactivity or after a termination request is received by the verification system, the emulation session is terminated 621. While the method 600 may end at this point, the verification system preferably also performs a password change 623 on the information account held by the information holder 904. Thus, while the initial password was used to sign into the information account during the login request 923, the password will be changed to a modified password and logged by the verification system 902. Thus, the next login request 923 submitted by the verification system 902 to the information holder 904 will include the modified password. After the password change 623 has been conducted, the verification system 902 may confirm that the password change took effect by submitting 625 a test account login request 923 to see if an account login confirmation 924 is received, which indicates a successful login. Additionally, the verification system 902 may store 627 the modified password so that it may be used in a subsequent account login request 923. While the frequency of the password change may be programmable, it preferably occurs after each emulation session.

All communications mentioned herein are preferably electronic communications that may take place wirelessly or over hardwired connections. The communications may be unsecured, but are preferably secured either by a communications channel security mechanism, such as a wireless access point (WAP) password, a secure socket layer (SSL) connection or a network firewall, or by data cryptography, such the use of data ciphers, e.g. a triple DES cipher, or both channel security and data cryptography.

Regarding system components, it will be readily apparent to those skilled in the art that components utilized in a system according to the present invention are presently available, such as web servers communications servers, database structures, physical dynamic client identifier devices, and random number generators for use as virtual dynamic client identifier devices.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method of managing online account profile information, said method comprising the steps of:
   registering a first client identifier;
   synchronizing to a second client identifier;
   receiving said first client identifier from a subscriber;
   receiving said second client identifier from said subscriber;
   creating an emulation session communication link;
   providing a selection of servers to said subscriber, said servers being connected to an information network;
   receiving a user selection of one of said servers;
   logging into said selected server using a site username and an initial site password, thereby enabling access to information correlated with an identifier that has been governmentally issued to said subscriber, wherein said information is accessible by said selected server;
   communicating with said selected server to change said site password, thereby creating a modified site password;
   overwriting said initial site password with said modified site password; and
   terminating said emulation session communication link.

2. A method according to claim 1, said method further comprising the steps of receiving a login request prior to said step of creating said emulation session communication link, said login request including a protection service account user name and a protection service account password.

3. A method according to claim 1, said second client identifier being received from said subscriber after receiving said first client identifier.

4. A method according to claim 1, said method further including the step of:
   displaying at least a portion of said information to said subscriber over said emulation session communication link.

5. A method according to claim 1, said first client identifier being a variable static client identifier.

6. A method according to claim 1, said second client identifier being a dynamic client identifier.

7. A method according to claim 1, said selection of servers being abstracted from the network internet protocol address of said servers.

8. A method according to claim 1, said initial site username being different than said first client identifier and also different than said second client identifier; and
   said initial site password being different than said first client identifier and also different than said second client identifier.

9. A method according to claim 1, said modified site password being different than said first client identifier and also different than said second client identifier.

* * * * *